United States Patent
Noguchi et al.

(10) Patent No.: US 8,458,398 B2
(45) Date of Patent: Jun. 4, 2013

(54) COMPUTER-READABLE MEDIUM STORING DATA MANAGEMENT PROGRAM, COMPUTER-READABLE MEDIUM STORING STORAGE DIAGNOSIS PROGRAM, AND MULTINODE STORAGE SYSTEM

(75) Inventors: Yasuo Noguchi, Kawasaki (JP);
Kazutaka Ogihara, Kawasaki (JP);
Masahisa Tamura, Kawasaki (JP);
Yoshihiro Tsuchiya, Kawasaki (JP);
Tetsutaro Maruyama, Kawasaki (JP);
Takashi Watanabe, Kawasaki (JP);
Tatsuo Kumano, Kawasaki (JP);
Kazuichi Oe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 640 days.

(21) Appl. No.: 12/585,384

(22) Filed: Sep. 14, 2009

(65) Prior Publication Data
US 2010/0106907 A1   Apr. 29, 2010

(30) Foreign Application Priority Data

Oct. 16, 2008   (JP) ................................ 2008-267280

(51) Int. Cl.
*G06F 12/00* (2006.01)
*G06F 11/00* (2006.01)

(52) U.S. Cl.
USPC ......... 711/114; 711/E12.103; 714/1; 714/6.1; 714/6.23; 714/799; 714/E11.112; 714/E11.113; 714/E11.118; 714/E11.142

(58) Field of Classification Search
USPC ..................... 711/114; 714/1, 6.1, 6.23, 799
See application file for complete search history.

(56) References Cited

U.S. PATENT DOCUMENTS

| | | | |
|---|---|---|---|
| 6,408,401 B1 * | 6/2002 | Bhavsar et al. | 714/6.2 |
| 7,363,457 B1 | 4/2008 | Dekoning et al. | |
| 2002/0138783 A1 * | 9/2002 | Turner et al. | 714/5 |

(Continued)

FOREIGN PATENT DOCUMENTS

| EP | 1 357 465 A2 | 10/2003 |
|---|---|---|
| EP | 1596303 | 11/2005 |

(Continued)

OTHER PUBLICATIONS

Partial European Search Report dated Feb. 10, 2010 and issued in corresponding European Patent Application 09170523.6.

(Continued)

*Primary Examiner* — Reginald Bragdon
*Assistant Examiner* — Aracelis Ruiz
(74) *Attorney, Agent, or Firm* — Staas & Halsey LLP

(57) ABSTRACT

A computer-readable medium storing a data management program makes a computer manage data redundantly stored in storage devices having storage areas split into slices for data management. The data management program realizes the following functions in the computer. A first function receives irregularity information indicating that each of one or more of the storage devices may be possibly faulty, and stores the irregularity information in a storage; and a second function determines, by reference to the irregularity information, whether or not a first storage device containing a slice to be accessed is possibly faulty, on receipt of access information indicating occurrence of a request to access the slice. When yes is determined, the second function instructs an external device to recover data stored in the slice, where the external device controls a second storage device storing redundant data identical to the data stored in the slice.

10 Claims, 27 Drawing Sheets

U.S. PATENT DOCUMENTS

| | | | |
|---|---|---|---|
| 2004/0128456 A1 | 7/2004 | Kobayashi et al. | |
| 2005/0235109 A1 | 10/2005 | Ogihara et al. | |
| 2006/0095813 A1* | 5/2006 | Yagisawa et al. | 714/55 |
| 2006/0143507 A1* | 6/2006 | Tanaka | 714/6 |
| 2006/0224850 A1 | 10/2006 | Yamamoto et al. | |
| 2007/0038830 A1 | 2/2007 | Iwamitsu et al. | |
| 2007/0101083 A1 | 5/2007 | Ogihara et al. | |
| 2008/0068899 A1 | 3/2008 | Ogihara et al. | |

FOREIGN PATENT DOCUMENTS

| | | |
|---|---|---|
| JP | 5-158625 | 6/1993 |
| JP | 06-187101 | 7/1994 |
| JP | 07-129331 | 5/1995 |
| JP | 07-262068 | 10/1995 |
| JP | 08-249133 | 9/1996 |
| JP | 10-333841 | 12/1998 |
| JP | 11-345095 | 12/1999 |
| JP | 2001-166974 | 6/2001 |
| JP | 2002-149500 | 5/2002 |
| JP | 2003-345531 | 12/2003 |
| JP | 2004-252692 | 9/2004 |
| JP | 2005-000468 | 1/2005 |
| JP | 2005-157739 | 6/2005 |
| JP | 2006-172320 | 6/2006 |
| JP | 2007-206931 | 8/2007 |
| WO | WO 2004/104845 | 12/2004 |

OTHER PUBLICATIONS

Patent Abstracts of Japan, Publication No. 2005-000468, Published Jan. 6, 2005.
Patent Abstracts of Japan, Publication No. 06-187101, Published Jul. 8, 1994.
Patent Abstracts of Japan, Publication No. 07-262068, Published Oct. 13, 1995.
European Search Report dated Apr. 16, 2010 in corresponding European Patent Application 09170523.6.
Patent Abstracts of Japan, Publication No. 2006-172320, published Jun. 29, 2006.
Patent Abstracts of Japan, Publication No. 2005-157739, published Jun. 16, 2005.
Patent Abstracts of Japan, Publication No. 08-249133, published Sep. 27, 1996.
Patent Abstracts of Japan, Publication No. 10-333841, published Dec. 18, 1998.
Patent Abstracts of Japan, Publication No. 2004-252692, published Sep. 9, 2004.
Patent Abstracts of Japan, Publication No. 2002-149500, published May 24, 2002.
Japanese Office Action mailed Jul. 10, 2012 issued in corresponding Japanese Patent Application No. 2008-267280.
Patent Abstracts of Japan, Publication No. 2007-206931, published Aug. 16, 2007.
Patent Abstracts of Japan, Publication No. 07-129331, published May 19, 1995.
Patent Abstracts of Japan, Publication No. 2003-345531, published Dec. 5, 2003.
Patent Abstracts of Japan, Publication No. 11-345095, Published Dec. 14, 1999.
Patent Abstracts of Japan, Publication No. 2001-166974, Published Jun. 22, 2001.
Patent Abstracts of Japan, Publication No. 05-158625, Published Jun. 25, 1993.
Japanese Patent Office Action dated Mar. 26, 2013 in Japanese Patent Application No. 2012-197110.

* cited by examiner

510 VIRTUAL-DISK METADATA STORAGE

511 VIRTUAL-DISK METADATA TABLE

| Disk-node ID | Disk ID | Slice ID | Status | Virtual-disk ID | Segment ID | Virtual-disk Address | Pairing Disk-node ID | Pairing Disk ID | Pairing Slice ID | Timestamp |
|---|---|---|---|---|---|---|---|---|---|---|
| SN-A | 1 | 1 | P | LVOL-X | 1 | ADDR1 | SN-C | 1 | 1 | t1 |
| SN-A | 1 | 2 | S | LVOL-X | 2 | ADDR2 | SN-B | 1 | 1 | t2 |
| ... | ... | ... | ... | ... | ... | ... | ... | ... | ... | ... |
| SN-B | 1 | 1 | P | LVOL-X | 2 | ADDR2 | SN-A | 1 | 2 | t2 |
| SN-B | 1 | 2 | F | NULL | NULL | NULL | NULL | NULL | NULL | NULL |
| SN-B | 1 | 3 | S | LVOL-X | n | ADDRn | SN-C | 1 | 3 | tn |
| ... | ... | ... | ... | ... | ... | ... | ... | ... | ... | ... |
| SN-C | 1 | 1 | S | LVOL-X | 1 | ADDR1 | SN-A | 1 | 1 | t1 |
| SN-C | 1 | 2 | F | NULL | NULL | NULL | NULL | NULL | NULL | NULL |
| SN-C | 1 | 3 | P | LVOL-X | n | ADDRn | SN-B | 1 | 3 | tn |
| ... | ... | ... | ... | ... | ... | ... | ... | ... | ... | ... |

FIG. 8

510 VIRTUAL-DISK METADATA STORAGE

511 VIRTUAL-DISK METADATA TABLE

| Disk-node ID | Disk ID | Slice ID | Status | Virtual-disk ID | Segment ID | Virtual-disk Address | Pairing Disk-node ID | Pairing Disk ID | Pairing Slice ID | Timestamp |
|---|---|---|---|---|---|---|---|---|---|---|
| SN–A | 1 | 1 | F | NULL | NULL | NULL | NULL | | NULL | (tn+1) |
| SN–A | 1 | 2 | S | LVOL–X | 2 | ADDR 2 | SN–B | 1 | 1 | t2 |
| ... | ... | ... | ... | ... | ... | ... | ... | ... | ... | ... |
| SN–B | 1 | 1 | P | LVOL–X | 2 | ADDR 2 | SN–C | 1 | 1 | t2 |
| SN–B | 1 | 2 | S | LVOL–X | 1 | ADDR1 | SN–C | 1 | 1 | (tn+1) |
| SN–B | 1 | 3 | S | LVOL–X | n | ADDRn | SN–C | 1 | 1 | tn |
| ... | ... | ... | ... | ... | ... | ... | ... | ... | ... | ... |
| SN–C | 1 | 1 | P | LVOL–X | 1 | ADDR1 | SN–B | 1 | 2 | (tn+1) |
| SN–C | 1 | 2 | F | NULL | NULL | NULL | NULL | | NULL | NULL |
| SN–C | 1 | 3 | P | LVOL–X | n | ADDRn | SN–B | 1 | 1 | tn |
| ... | ... | ... | ... | ... | ... | ... | ... | ... | ... | ... |

FIG. 12

510 VIRTUAL-DISK METADATA STORAGE

511 VIRTUAL-DISK METADATA TABLE

| Disk-node ID | Disk ID | Slice ID | Status | Virtual-disk ID | Segment ID | Virtual-disk Address | Pairing Disk-node ID | Pairing Disk ID | Pairing Slice ID | Timestamp |
|---|---|---|---|---|---|---|---|---|---|---|
| SN-A | 1 | 1 | P | LVOL-X | 1 | ADDR1 | SN-C | 1 | 1 | t1 |
| SN-A | 1 | 2 | S | LVOL-X | 2 | ADDR2 | SN-B | 1 | 1 | t2 |
| ... | ... | ... | ... | ... | ... | ... | ... | ... | ... | ... |
| SN-B | 1 | 1 | P | LVOL-X | 1 | ADDR2 | SN-C | 1 | 1 | t2 |
| SN-B | 1 | 2 | S | LVOL-X | 1 | ADDR1 | SN-C | 1 | 1 | (tn+1) |
| SN-B | 1 | 3 | S | LVOL-X | n | ADDRn | SN-C | 1 | n | tn |
| ... | ... | ... | ... | ... | ... | ... | ... | ... | ... | ... |
| SN-C | 1 | 1 | P | LVOL-X | 1 | ADDR1 | SN-B | 1 | 2 | (tn+1) |
| SN-C | 1 | 2 | F | NULL | NULL | NULL | NULL | 1 | NULL | NULL |
| SN-C | 1 | 3 | P | LVOL-X | n | ADDRn | SN-B | 1 | n | tn |
| ... | ... | ... | ... | ... | ... | ... | ... | ... | ... | ... |

FIG. 15

450 METADATA STORAGE

451 METADATA TABLE

| Disk-node ID | Disk ID | Slice ID | Status | Virtual-disk ID | Segment ID | Virtual-disk Address | Pairing Disk-node ID | Pairing Disk ID | Pairing Slice ID | Timestamp | Redundancy Status |
|---|---|---|---|---|---|---|---|---|---|---|---|
| SN-A | 1 | 1 | P | LVOL-X | 1 | ADDR1 | SN-C | 1 | 1 | t1 | Normal |
| SN-A | 1 | 2 | S | LVOL-X | 2 | ADDR2 | SN-B | 1 | 1 | t2 | Normal |
| ... | ... | ... | ... | ... | ... | ... | ... | ... | ... | ... | ... |

FIG. 18

810 VIRTUAL-DISK METADATA STORAGE

811 VIRTUAL-DISK METADATA TABLE

| Disk-node ID | Disk ID | Slice ID | Status | Virtual-disk ID | Segment ID | Virtual-disk Address | Pairing Disk-node ID | Pairing Disk ID | Pairing Slice ID | Timestamp | Redundancy Status |
|---|---|---|---|---|---|---|---|---|---|---|---|
| SN-A | 1 | 1 | P | LVOL-X | 1 | ADDR1 | SN-C | 1 | 1 | t1 | Normal |
| SN-A | 1 | 2 | S | LVOL-X | 2 | ADDR2 | SN-B | 1 | 1 | t2 | Normal |
| ... | ... | ... | ... | ... | ... | ... | ... | ... | ... | ... | ... |
| SN-B | 1 | 1 | P | LVOL-X | 2 | ADDR2 | SN-A | 1 | 1 | t2 | Normal |
| SN-B | 1 | 2 | F | NULL | NULL | NULL | NULL | 1 | NULL | NULL | NULL |
| SN-B | 1 | 3 | S | LVOL-X | n | ADDRn | SN-C | 1 | 1 | tn | Normal |
| ... | ... | ... | ... | ... | ... | ... | ... | ... | ... | ... | ... |
| SN-C | 1 | 1 | S | LVOL-X | 1 | ADDR1 | SN-A | 1 | 1 | t1 | Normal |
| SN-C | 1 | 2 | F | NULL | NULL | NULL | NULL | 1 | NULL | NULL | NULL |
| SN-C | 1 | 3 | P | LVOL-X | n | ADDRn | SN-B | 1 | 1 | tn | Normal |
| ... | ... | ... | ... | ... | ... | ... | ... | ... | ... | ... | ... |

FIG. 19

810 VIRTUAL-DISK METADATA STORAGE

811 VIRTUAL-DISK METADATA TABLE

| Disk-node ID | Disk ID | Slice ID | Status | Virtual-disk ID | Segment ID | Virtual-disk Address | Pairing Disk-node ID | Pairing Disk ID | Pairing Slice ID | Timestamp | Redundancy Status |
|---|---|---|---|---|---|---|---|---|---|---|---|
| SN-A | 1 | 1 | B | LVOL-X | 1 | ADDR1 | SN-C | 1 | 1 | t(n+1) | NULL |
| SN-A | 1 | 2 | S | LVOL-X | 2 | ADDR2 | SN-B | 1 | 1 | t2 | Normal |
| ... | ... | ... | ... | ... | ... | ... | ... | ... | ... | ... | ... |
| SN-B | 1 | 1 | P | LVOL-X | 2 | ADDR2 | SN-A | 1 | 2 | t2 | Normal |
| SN-B | 1 | 2 | S | LVOL-X | 1 | ADDR1 | SN-C | 1 | 1 | t(n+1) | Copying |
| SN-B | 1 | 3 | S | LVOL-X | n | ADDRn | SN-C | 1 | 3 | tn | Normal |
| ... | ... | ... | ... | ... | ... | ... | ... | ... | ... | ... | ... |
| SN-C | 1 | 1 | P | LVOL-X | 1 | ADDR1 | SN-A | 1 | 1 | t(n+1) | Copying |
| SN-C | 1 | 2 | F | NULL | NULL | NULL | NULL | 1 | NULL | NULL | NULL |
| SN-C | 1 | 3 | P | LVOL-X | n | ADDRn | SN-B | 1 | 3 | tn | Normal |
| ... | ... | ... | ... | ... | ... | ... | ... | ... | ... | ... | ... |

FIG. 23

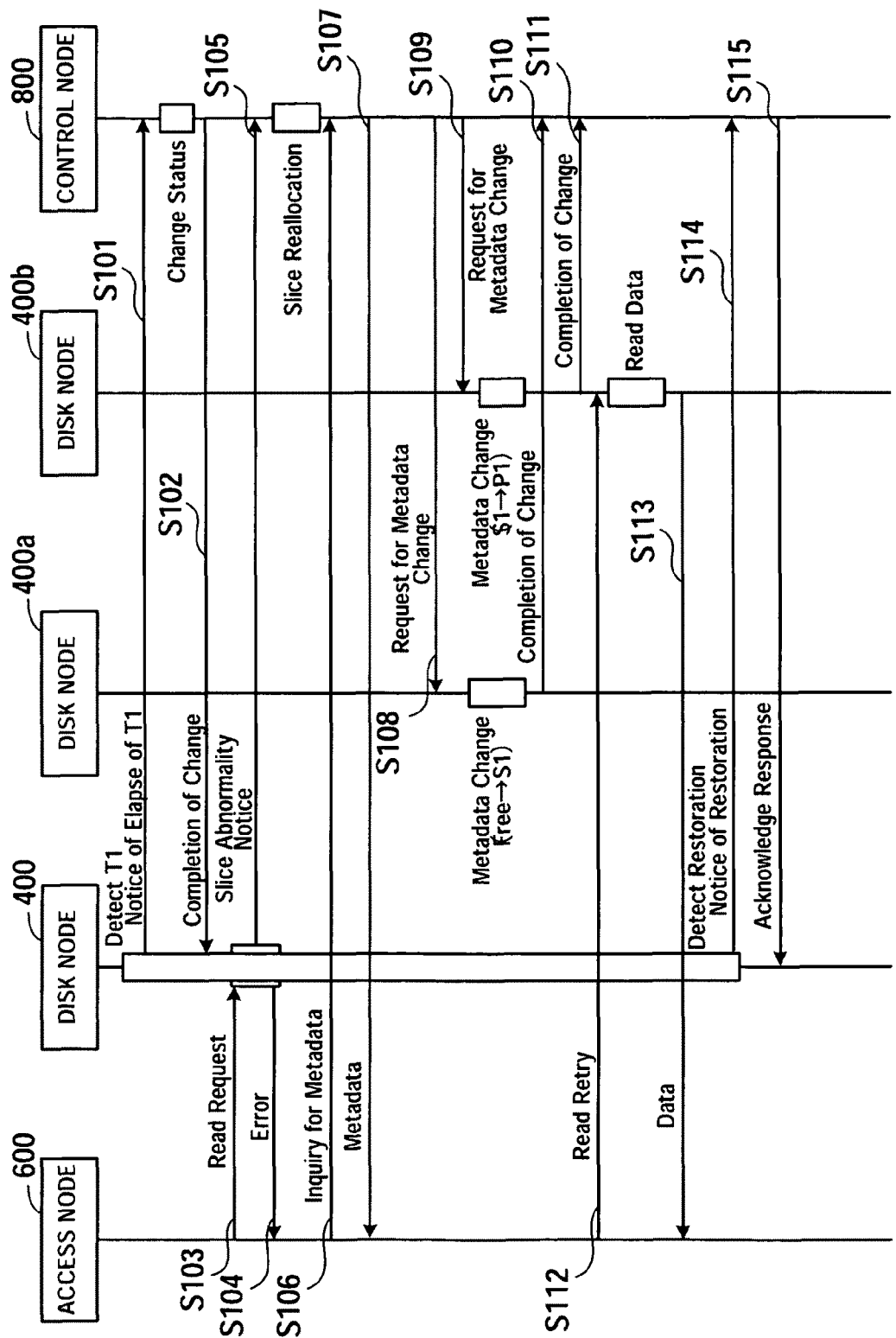

COMPUTER-READABLE MEDIUM STORING DATA MANAGEMENT PROGRAM, COMPUTER-READABLE MEDIUM STORING STORAGE DIAGNOSIS PROGRAM, AND MULTINODE STORAGE SYSTEM

CROSS-REFERENCE TO RELATED APPLICATION(S)

This application is based upon and claims the benefits of priority from the prior Japanese Patent Application No. 2008-267280 filed on Oct. 16, 2008, the entire contents of which are incorporated herein by reference.

FIELD

The embodiments discussed herein relate to a computer-readable medium storing a data management program for managing redundantly stored data, a computer-readable medium storing a storage diagnosis program for diagnosing a storage device, and a multinode storage system constituted by computers in which the data management program and the storage diagnosis program are executed.

BACKGROUND

The multinode storage system is one of the systems for management of data on a network. The multinode storage system is constituted by a plurality of disk nodes, an access node, and a control node, which are connected through a network. A virtual disk is defined in the multinode storage system. The virtual disk is constituted by a plurality of unit storage areas called segments. The disk nodes manage storage areas in storage devices connected to the disk nodes by dividing the storage devices into unit areas called slices. The control node manages the correspondences between the segments (constituting the virtual disk) and the slices (managed by the respective disk nodes), and sends to the access node metadata indicating the correspondences between the segments and the slices. When the access node receives a request for data access designating data in the virtual disk, the access node determines a slice corresponding to the segment and storing the data, on the basis of the metadata. Then, the access node sends an access request to a disk node managing the slice.

In the above multinode storage system, the user of the access node can use a number of storage devices connected to the plurality of disk nodes as if to use a local storage device. Further, it is possible to redundantly (doubly) store data and realize redundant data storage by allocating two slices to each segment. In the case where the data are redundantly stored, it is possible to prevent loss of the data even when a storage device fails.

However, even in the case where the data are redundantly stored, the data redundancy in some segments is broken when failure of a storage device impedes access to the storage device. In such a case, recovery processing is performed. In the recovery processing, the control node allocates a new slice to each segment in which the data redundancy is broken (i.e., each segment in which the data redundancy is to be recovered). Then, the control node stores in the newly allocated slice a duplicate of the data in the segment. Thus, the data redundancy in each segment is recovered.

The attributes "primary slice" and "secondary slice" are respectively assigned to the two slices allocated to each segment in the virtual disk, and the access node accesses the primary slice. When a storage device containing a primary slice fails, the control node changes the attribute of the secondary slice to the primary slice, so that the access node can access data identical to the data stored in the failed storage device before completion of the recovery processing. (See, for example, International Patent Publication WO2004/104845.)

Incidentally, the functional failure of the storage device is one of failures which impede data access from the access node. When a failure occurs in a storage device, a disk node detects the failure, and informs the control node of the occurrence of the failure, so that the control node can recognize the occurrence of the failure. Then, the recovery processing is performed under control of the control node. Nevertheless, in order to prevent erroneous failure detection, it is necessary to determine the occurrence of a failure after a certain suspension time elapses since the detection of the failure by the disk node. During the suspension time, processing for changing a storage device to be accessed by the access node to another storage device is not performed, and therefore data access from the access node is suspended.

When a failure occurs in a storage device containing a primary slice, access from the access node to the primary slice occurring after the occurrence of the failure becomes an error. On the other hand, the disk node cannot know whether an irrecoverable failure occurs, or a transient trouble occurs so that the access becomes possible after some suspension time elapses. Therefore, until a predetermined suspension time elapses, the disk node does not determine that the storage device fails. Thus, the timing of the change of the attribute from the secondary slice to the primary slice is delayed, so that the duration for which the access from the access node is suspended increases.

SUMMARY

According to an aspect of the present invention, a computer-readable medium storing a data management program which makes a computer perform processing for managing data redundantly stored in a plurality of storage devices having storage areas split into a plurality of slices for data management. The data management program realizes in the computer: an irregularity-information storage; an irregularity-information management unit which receives irregularity information indicating that a possibility of failure of each of one or more of the plurality of storage devices exists, and stores the irregularity information in the irregularity-information storage; and a recovery instruction unit which determines, by reference to the irregularity information stored in the irregularity-information storage, whether or not a possibility of failure of a first one of the plurality of storage devices containing a slice to be accessed exists, on receipt of access information indicating occurrence of a request to access the slice to be accessed. When the recovery instruction unit determines that the possibility of failure of the first one of the plurality of storage devices containing the slice to be accessed exists, the recovery instruction unit instructs a first slice management unit to perform processing for recovering data stored in the slice to be accessed, where the first slice management unit has a function of managing data input into and data output from a second one of the plurality of storage devices which stores redundant data identical to the data stored in the slice to be accessed.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWING(S)

FIG. 8 illustrates an example of a data structure in a virtual-disk metadata storage in the first embodiment;

Figure 11:
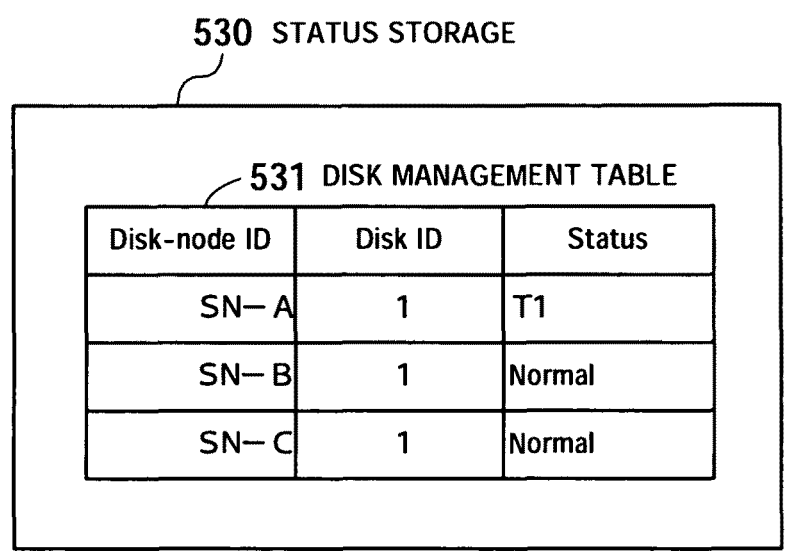
Figure 13:
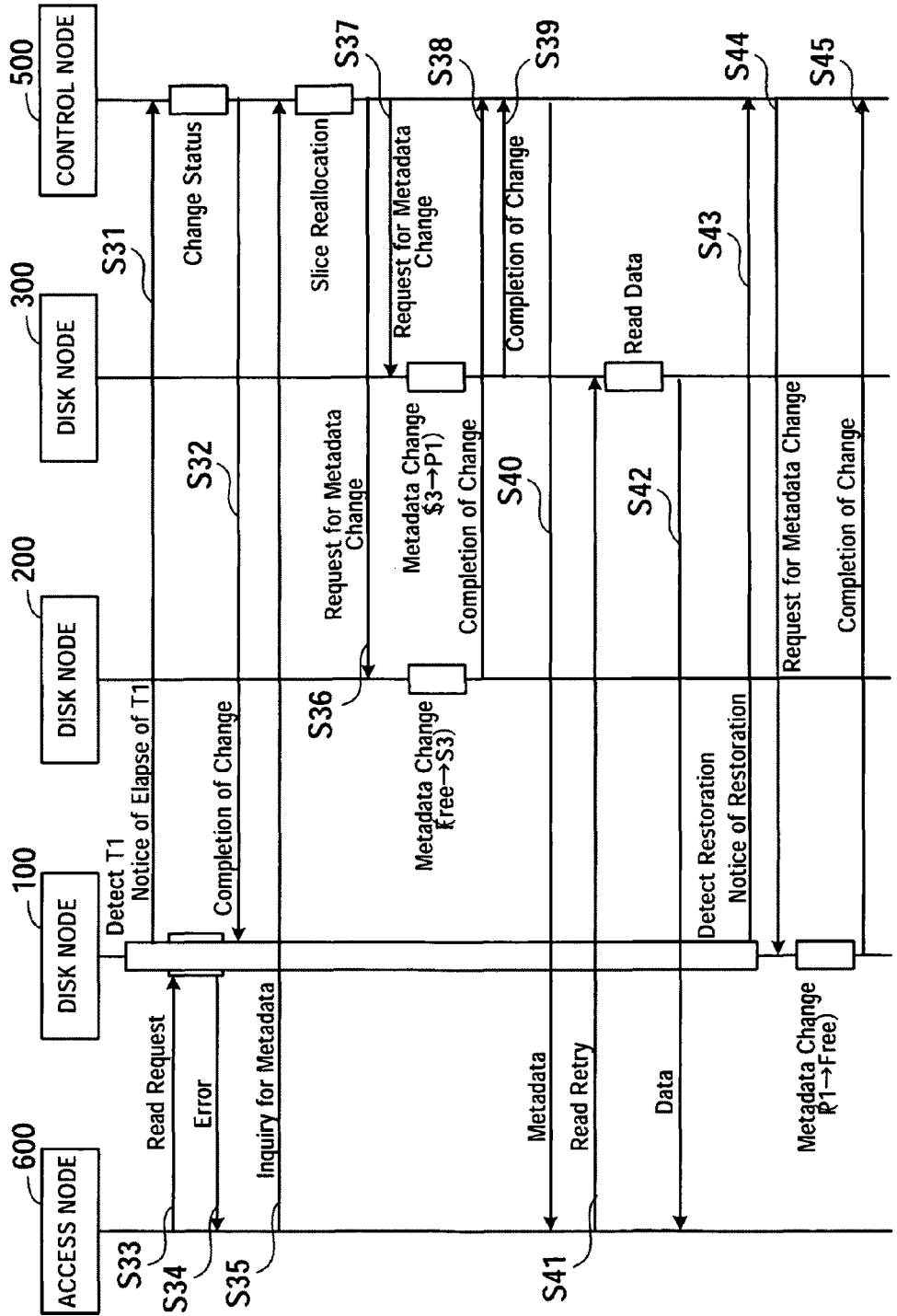
Figure 14:
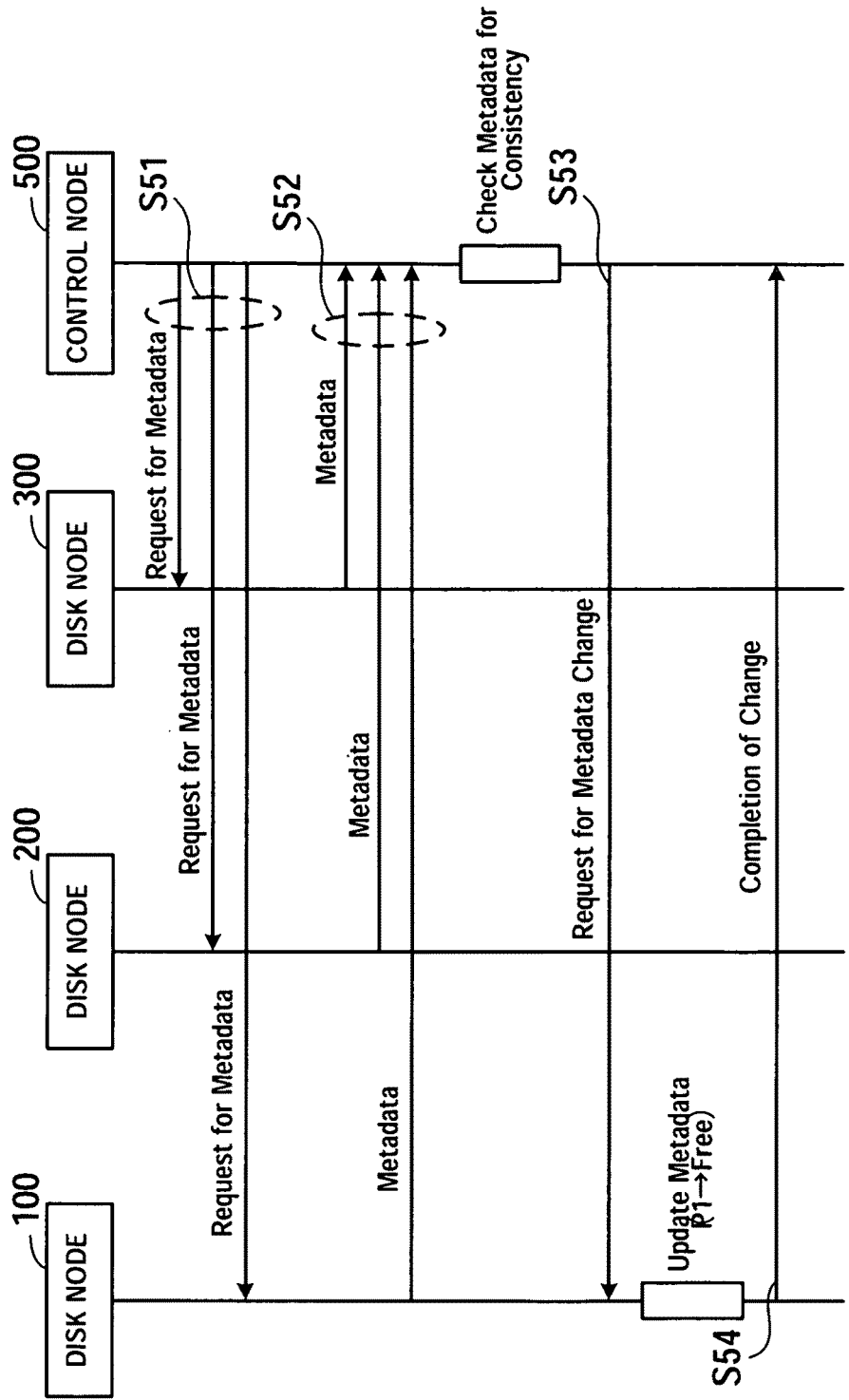
Figure 16:
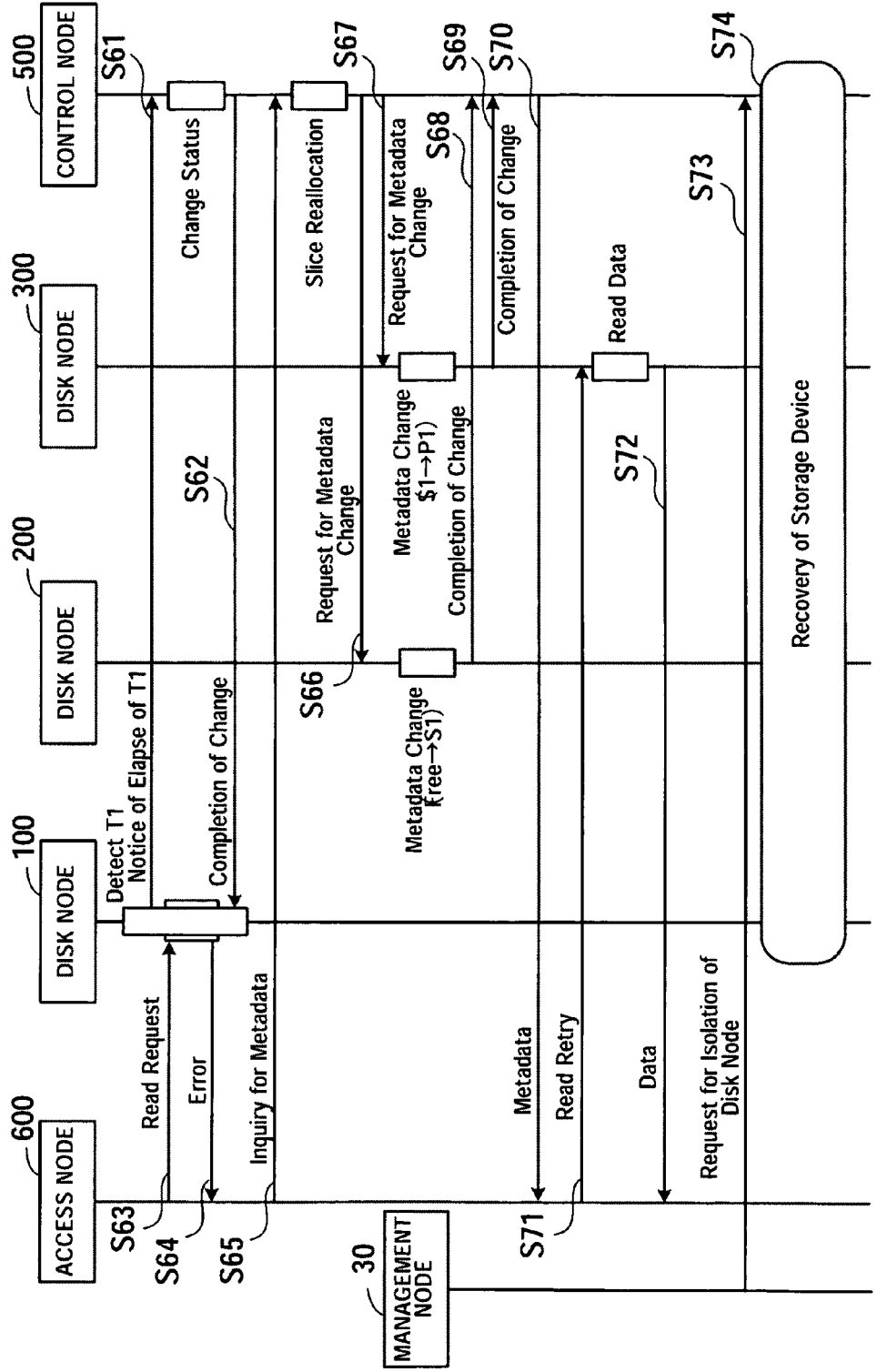
Figure 17:
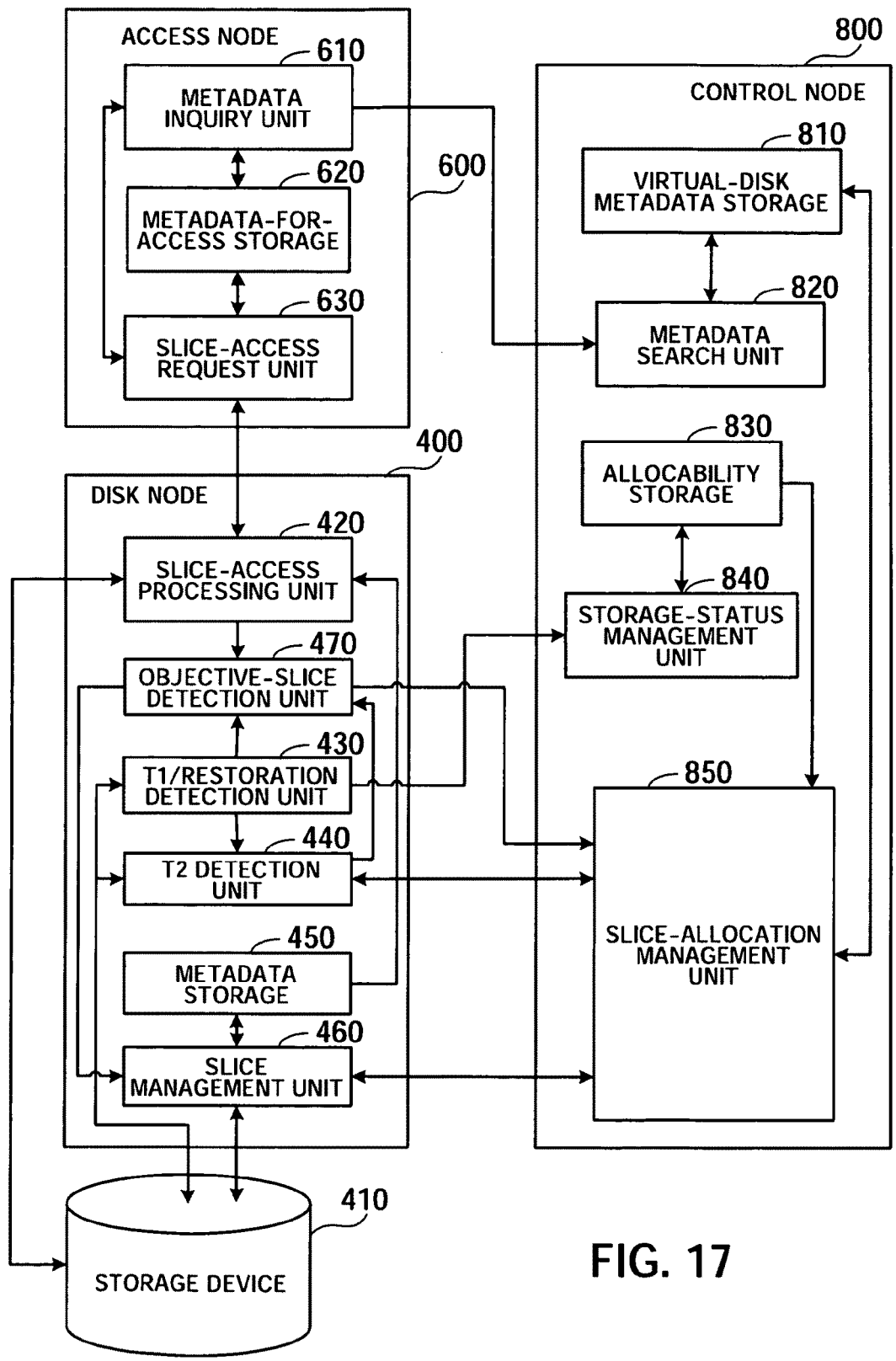
Figure 20:
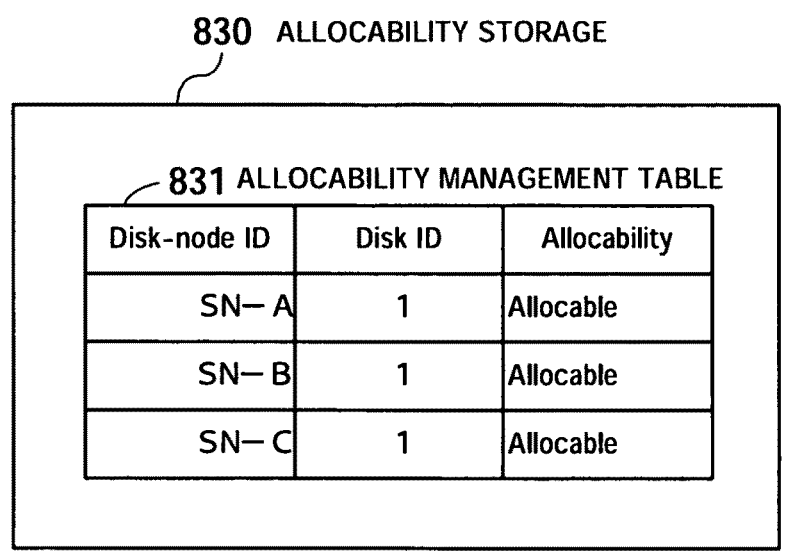
Figure 21:
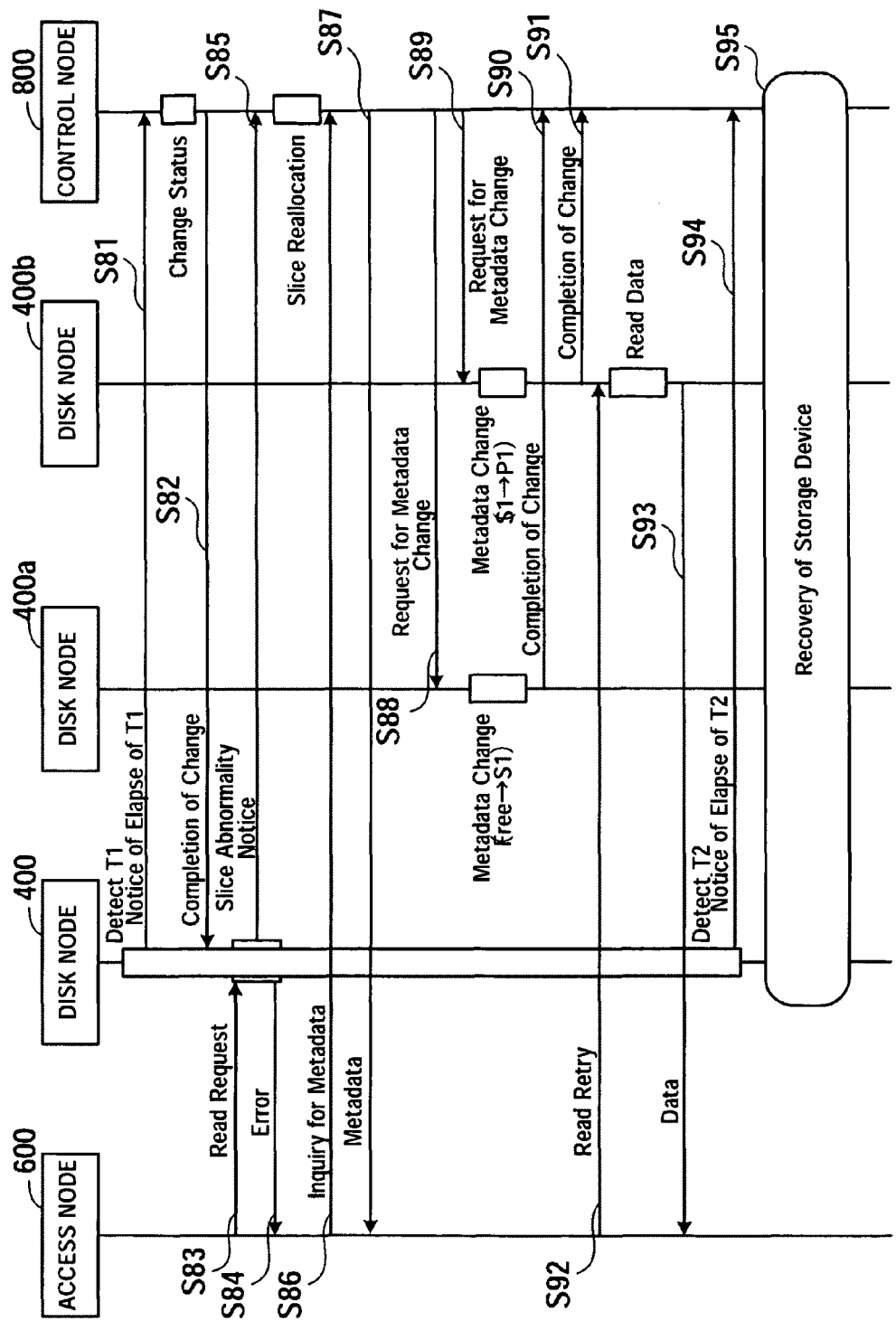
Figure 22:
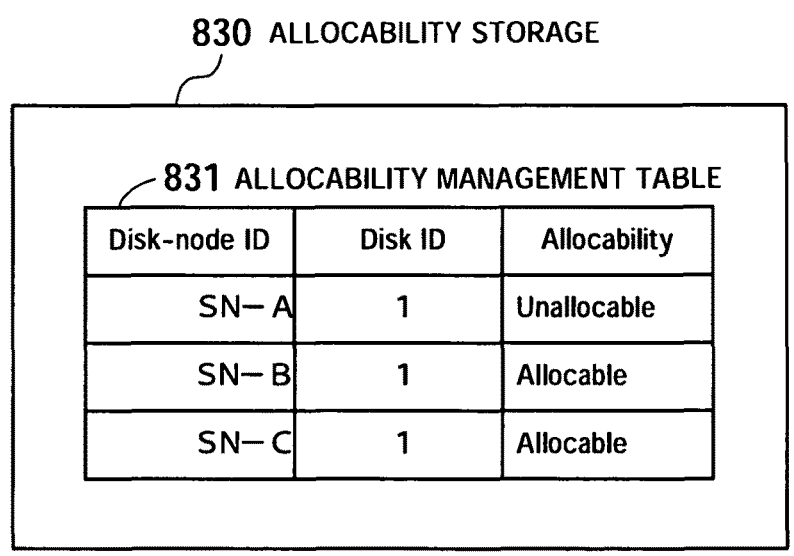
Figure 25:
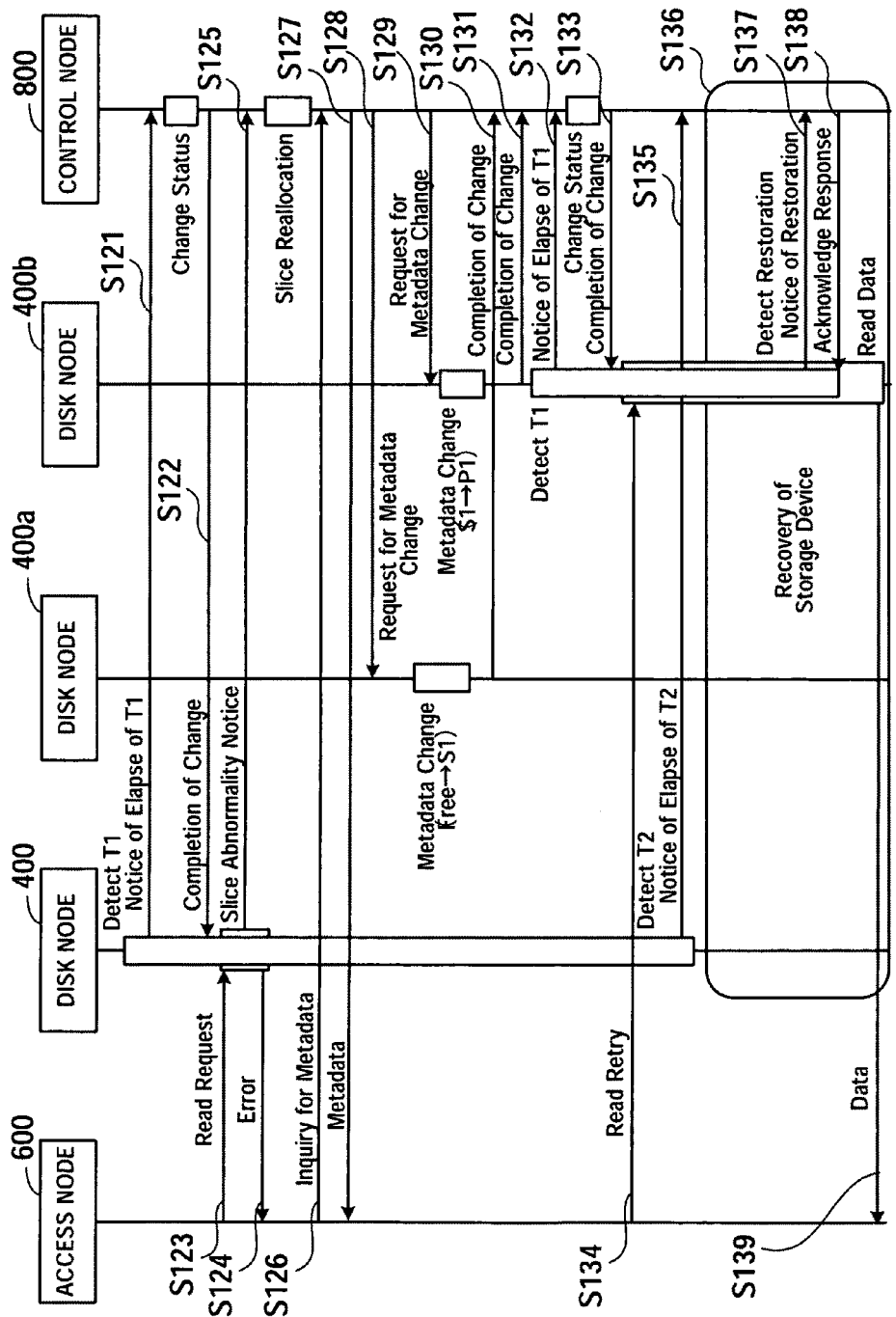
Figure 26:
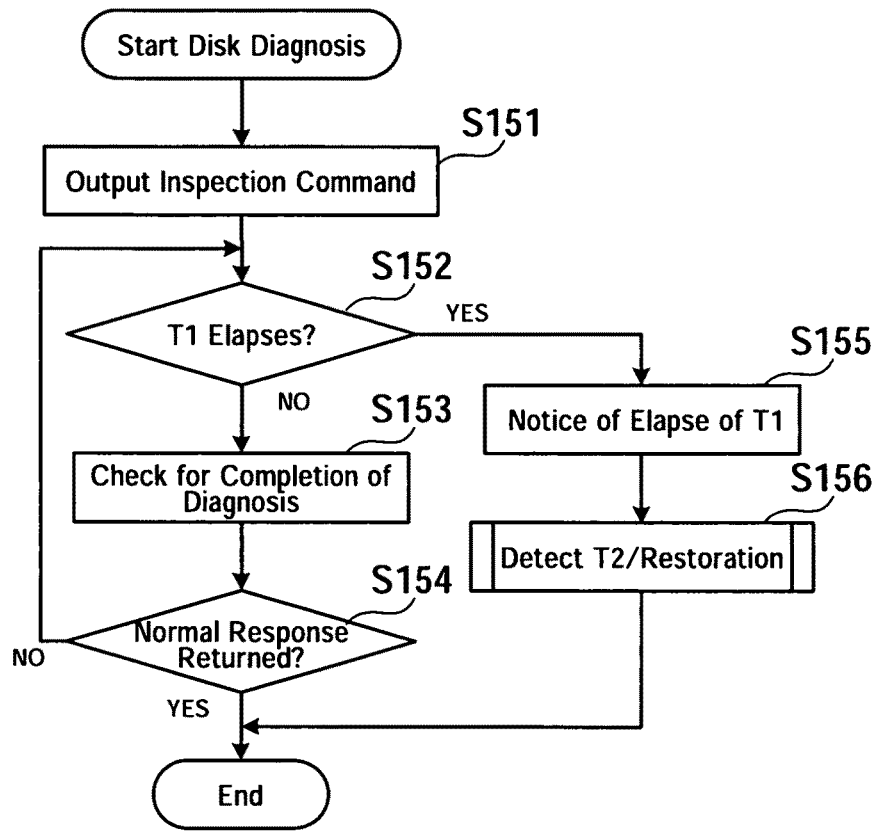
Figure 27:
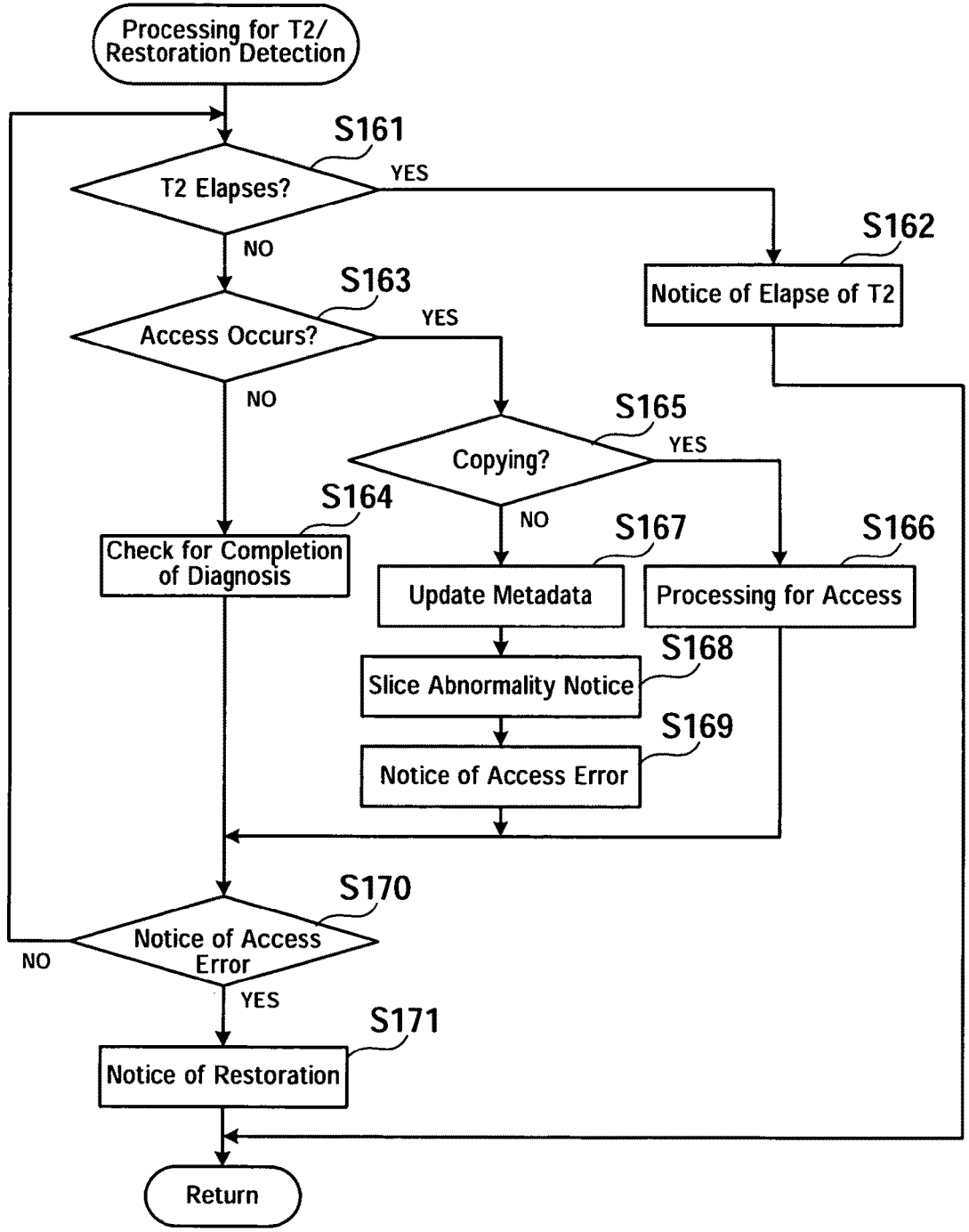

FIG. 11 indicates examples of the contents of the status storage after a status change in the first embodiment;

FIG. 12 indicates examples of the contents of a virtual-disk metadata table after the status change in the first embodiment;

FIG. 13 is a sequence diagram indicating a sequence of processing for slice reallocation which is performed when the load imposed on a storage device is excessive in the first embodiment;

FIG. 14 is a sequence diagram indicating a sequence of processing for dissolving inconsistency by use of time stamping in the first embodiment;

FIG. 15 indicates examples of the contents of the virtual-disk metadata table after reconstruction in the first embodiment;

FIG. 16 is a sequence diagram indicating a sequence of processing for instructing isolation of a disk node from the management node in the second embodiment;

FIG. 17 is a block diagram illustrating the functions of the respective devices constituting the multinode storage system according to the third embodiment;

FIG. 18 illustrates an example of a data structure in a metadata storage in the third embodiment;

FIG. 19 illustrates an example of a data structure in a virtual-disk metadata storage in the third embodiment;

FIG. 20 illustrates an example of a data structure in an allocability storage in the third embodiment;

FIG. 21 is a sequence diagram indicating a sequence of processing for slice reallocation which is performed when the storage device fails in the third embodiment;

FIG. 22 indicates examples of the contents of the allocability storage after a change of the allocability in the third embodiment;

FIG. 23 indicates examples of the contents of a virtual-disk metadata table after updating in the third embodiment;

FIG. 24 is a sequence diagram indicating a sequence of processing for slice reallocation which is performed when the load imposed on a storage device is too heavy in the third embodiment;

FIG. 25 is a sequence diagram indicating a sequence of processing for slice allocation which is performed when an elapse of the time T1 is detected in more than one disk in the third embodiment;

FIG. 26 is a flow diagram indicating a sequence of disk diagnosis processing in the third embodiment; and FIG. 27 is a flow diagram indicating a sequence of T2/restoration detection processing in the third embodiment.

DESCRIPTION OF EMBODIMENT(S)

The embodiments will be explained below with reference to the accompanying drawings, wherein like reference numbers refer to like elements throughout.

1. Outline of Typical Multinode Storage System

Figure 1:
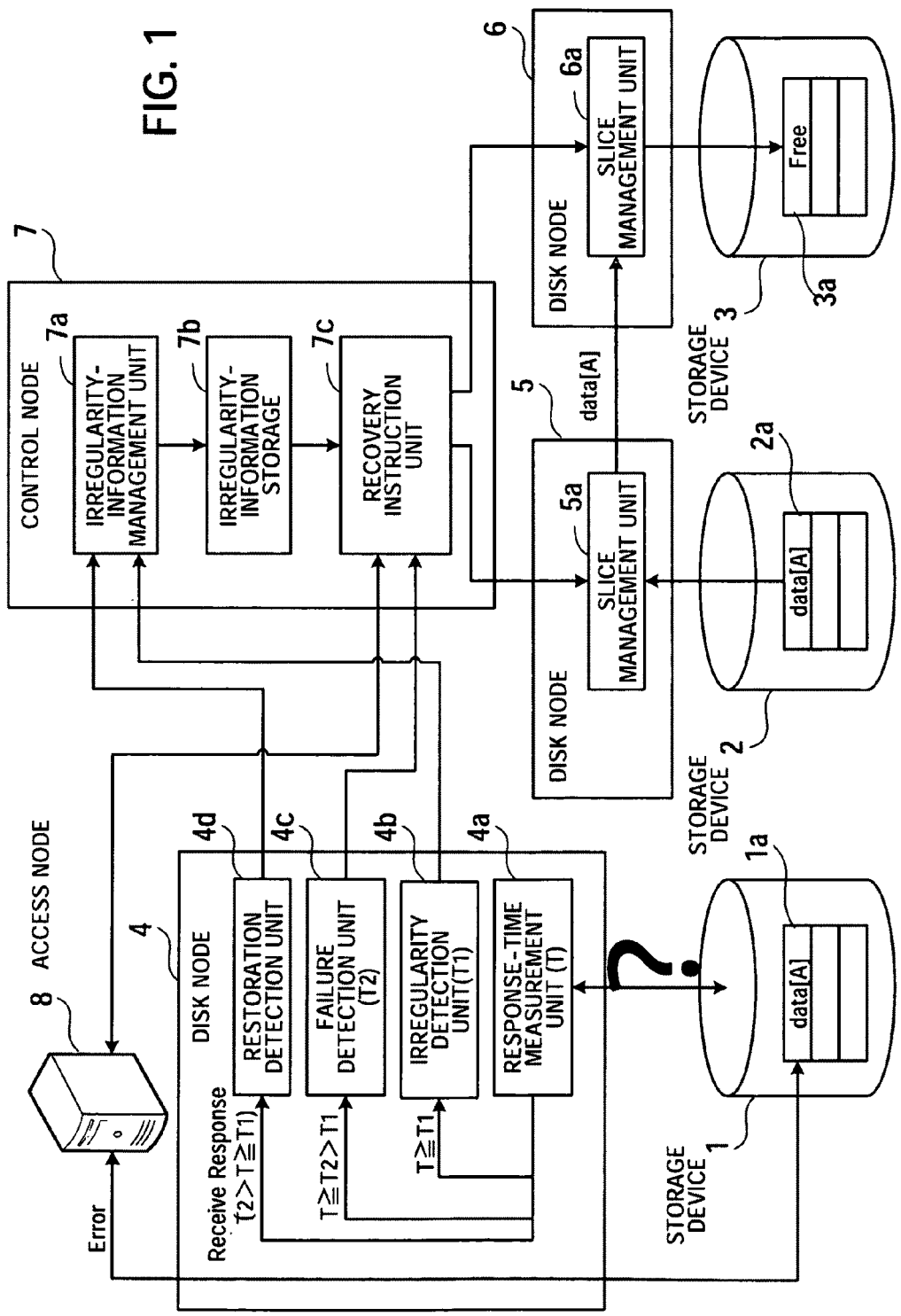
FIG. 1 illustrates representative functions of a typical multinode storage system disclosed in the present application.

FIG. 1 illustrates an outline of a typical multinode storage system presented by the present patent application. The multinode storage system illustrated in FIG. 1 comprises storage devices 1, 2, and 3, disk nodes 4, 5, and 6, a control node 7, and an access node 8. The disk nodes 4, 5, and 6 manage data redundantly (doubly) stored in the storage devices 1, 2, and 3. The storage areas of the storage devices 1, 2, and 3 are divided into a plurality of slices and managed on a slice-by-slice basis. The storage devices 1, 2, and 3 are locally connected to the disk nodes 4, 5, and 6, respectively. The expression "locally connected" means that the connections between the storage devices and the disk nodes are established without use of the network through which the disk nodes 4, 5, and 6, the control node 7, and the access node 8 are connected.

The disk node 4 comprises a response-time measurement unit 4a, an irregularity detection unit 4b, a failure detection unit 4c, and a restoration detection unit 4d. The response-time measurement unit 4a issues an inspection command to the storage device 1, which is locally connected to the disk node 4. Then, the response-time measurement unit 4a measures the time T which elapses since the issue of the inspection command until a response to the inspection command is returned from the storage device 1.

An irregularity-detection reference time T1 is set in advance in the irregularity detection unit 4b. For example, the irregularity-detection reference time T1 is stored in a memory managed by the irregularity detection unit 4b, and the irregularity-detection reference time T1 is the time in which the storage device 1 can return a response to the inspection command when the storage device normally operates. For example, the irregularity-detection reference time T1 is one second. In the case where no response is returned from the storage device 1 even when the elapsed time reaches the irregularity-detection reference time T1, the irregularity detection unit 4b transmits irregularity information to the control node 7. The irregularity information indicates that a possibility of failure of the storage device 1 exists (i.e., the storage device 1 may be possibly faulty).

A failure-detection reference time T2, which is greater than the irregularity-detection reference time T1, is set in advance in the failure detection unit 4c. For example, the failure-detection reference time T2 is the maximum time in which the storage device 1 can return a response to the inspection command even when the processing load imposed on the storage device 1 is excessive as long as the operation of the storage device 1 is normal. For example, the failure-detection reference time T2 is one minute. In the case where no response is returned from the storage device 1 even when the elapsed time reaches the failure-detection reference time T2, the irregularity detection unit 4b transmits failure-detection information to the control node 7.

When the restoration detection unit 4d receives a response to the inspection command after the restoration detection unit 4d transmits the irregularity information, the restoration detection unit 4d transmits restoration information to the control node 7. The restoration information indicates that the storage device 1 is restored.

The disk node 5 comprises a slice management unit 5a. The slice management unit 5a manages data input into and data output from the storage device 2. The disk node 6 comprises a slice management unit 6a. The slice management unit 6a manages data input into and data output from the storage device 3. Although not shown in FIG. 1, the disk node 4 also comprises a function similar to the slice management unit 5a or 6a, and each of the disk nodes 5 and 6 also comprises functions similar to the functions such as the response-time measurement unit 4a, the irregularity detection unit 4b, the failure detection unit 4c, and the restoration detection unit 4d.

The control node 7 comprises an irregularity-information management unit 7a, an irregularity-information storage 7b, and a recovery instruction unit 7c. When the irregularity-information management unit 7a receives the irregularity information from one of the disk nodes 4, 5, and 6, the irregularity-information management unit 7a stores the irregularity information in the irregularity-information storage 7b. For example, part of the storage area of the memory in the control node 7 may be used as the irregularity-information storage 7b. When the recovery instruction unit 7c receives access information which indicates that a request to access a slice in the storage devices 1, 2, and 3 is issued, the recovery instruction unit 7c refers to the irregularity information stored in the irregularity-information storage 7b, and determines whether or not a possibility of failure of the storage device containing the slice requested to be accessed exists. That is, when the irregularity-information storage 7b stores irregularity information which indicates that a possibility of failure of the storage device containing the slice requested to be accessed exists, the recovery instruction unit 7c determines that a possibility of failure of the storage device containing the slice requested to be accessed exists.

When the possibility of failure is determined, the recovery instruction unit 7c sends an instruction to perform processing for recovering data stored in the slice requested to be accessed, to a disk node connected to a storage device which stores redundant data identical to the data stored in the slice requested to be accessed. In the processing for recovering data stored in the slice requested to be accessed, the redundant data identical to the data stored in the slice requested to be accessed is copied into another storage device so as to recover the redundancy of the data.

The access node 8 accesses the plurality of storage devices 1, 2, and 3. In the example of FIG. 1, the access information is transmitted from the access node 8 to the control node 7 when access by the access node 8 to a slice in the storage device 1 fails. In this case, the recovery instruction unit 7c receives the access information from the access node 8, and informs the access node 8 of the location of the redundant data.

In the multinode storage system configured as above, when the operation of the storage device 1 becomes out of order (irregular) due to overloading or the like, the response time T of the storage device 1 to an inspection command outputted from the response-time measurement unit 4a can become greater than the irregularity-detection reference time T1 and smaller than the failure-detection reference time T2. Further, when the storage device 1 fails, the storage device 1 does not output a response to the inspection command even after the failure-detection reference time T2 elapses.

When the elapsed time T measured by the response-time measurement unit 4a exceeds the irregularity-detection reference time T1 because of an irregularity or failure of the storage device 1, the irregularity detection unit 4b outputs to the control node irregularity information indicating that a possibility of failure of the storage device 1 exists. Then, the irregularity-information management unit 7a in the control node 7 stores the irregularity information in the irregularity-information storage 7b. Thereafter, when the access node 8 accesses the leading slice 1a in the storage device 1, the access becomes an error. Then, the access node 8 transmits access information to the control node 7, where the access information indicates that access to the leading slice 1a in the storage device 1 fails. The recovery instruction unit 7c in the control node 7 refers to the irregularity-information storage 7b, and recognizes that a possibility of failure of the storage device 1 exists. Then, the recovery instruction unit 7c sends to the disk nodes 5 and 6 an instruction to recover the data in the slice 1a, which is indicated in the access information.

Assume that a duplicate of the data (data[A]) in the slice 1a is stored in the leading slice 2a in the storage device 2, and the leading slice 3a in the storage device 3 is free (i.e., no valid data is stored in the leading slice in the storage device 3). In this case, the recovery instruction unit 7c sends to the slice management unit 5a in the disk node 5 an instruction to copy the data in the slice 2a into the slice 3a. Then, the slice management unit 5a reads out the data in the slice 2a, and transfers the data (read out from the slice 2a) to the slice management unit 6a. The slice management unit 6a in the disk node 6 receives the data in the slice 2a, and writes the data into the slice 3a.

The recovery instruction unit 7c informs the access node 8 that the duplicate of the data in the slice 1a is stored in the slice 2a in the storage device 2. Therefore, the access node 8 can quickly change the object (slice) to be accessed, to the slice 2a in the storage device 2.

Thereafter, when the storage device 1 does not output a response to the disk node 4 even when the failure-detection reference time T2 elapses, the failure detection unit 4c detects an elapse of the failure-detection reference time T2. Then, the failure detection unit 4c transmits to the control node 7 failure-detection information indicating that the storage device 1 is faulty. The recovery instruction unit 7c in the control node 7 sends to the disk node 5 an instruction to recover data in all the slices in the storage device 2.

When a response from the storage device 1 is outputted to the disk node 4 before the elapse of the failure-detection reference time T2, the restoration detection unit 4d detects recovery of the storage device 1. Then, restoration information indicating the restoration of the storage device 1 is transmitted from the restoration detection unit 4d to the control node 7. The irregularity-information management unit 7a in the control node 7 removes the irregularity information on the storage device 1 from the irregularity-information storage 7b. As mentioned before, the irregularity information on the storage device 1 indicates that a possibility of failure of the storage device 1 exists.

As explained above, in the multinode storage system illustrated in FIG. 1, the failure of each of the storage devices 1, 2, and 3 is detected in the two stages respectively based on the irregularity-detection reference time T1 and the failure-detection reference time T2. Conventionally, the failure of each storage device is detected based on only the failure-detection reference time T2, i.e., recovery processing is started when a disk node detects an elapse of the failure-detection reference time T2. Thereafter, if the failure-detection reference time T2 is too great, the recovery processing is delayed, so that the duration for which access is impossible is lengthened. On the other hand, in the multinode storage system of FIG. 1, the disk node 4 detects an elapse of the irregularity-detection reference time T1, and informs the control node 7 of the elapse of the irregularity-detection reference time T1. Then, the control node 7 instructs to perform recovery processing of only the data (e.g., the data in the slice 1a) which cannot be successfully accessed. Therefore, it is possible to prevent increase in the duration for which access is impossible.

Although the storage devices 1, 2, and 3 are respectively connected to the different disk nodes 4, 5, and 6 in the multinode storage system of FIG. 1, the multinode storage system may have a configuration in which a plurality of storage devices are connected to a single node. In such a multinode storage system, for example, the functions of the control node 7 and the disk nodes 4, 5, and 6 illustrated in FIG. 1 are installed in the single node to which the plurality of storage devices are connected.

In the multinode storage systems, data access is performed through a virtual disk. At this time, the correspondences between the storage areas in the virtual disk and the storage areas in the storage devices can be managed by use of metadata. Therefore, in the embodiments explained below, the correspondences between the storage areas in the virtual disk and the storage areas in the storage devices are managed by use of metadata.

2. First Embodiment

The first embodiment is explained in detail below.

2.1 System Configuration

Figure 2:
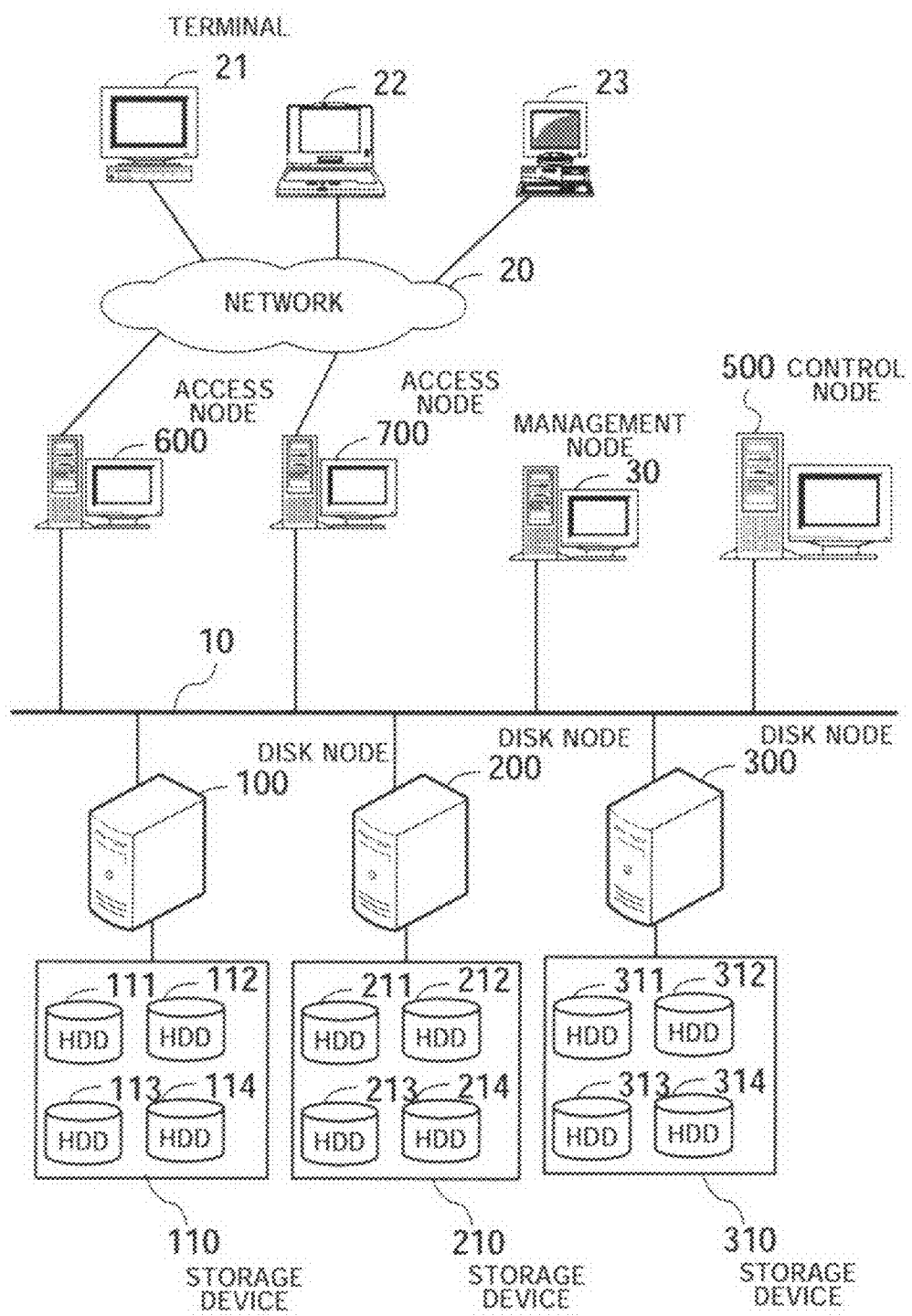
FIG. 2 illustrates an example of a configuration of the multinode storage system according to the first embodiment.

FIG. 2 illustrates an example of the configuration of the multinode storage system according to the first embodiment. In the multinode storage system of FIG. 2, disk nodes 100, 200, and 300, a control node 500, access nodes 600 and 700, and a management node 30 are connected through a network 10, and storage devices 110, 210, and 310 are respectively connected to the disk nodes 100, 200, and 300.

A plurality of hard disk drives (HDDs) 111, 112, 113, and 114 are installed in the storage device 110, a plurality of HDDs 211, 212, 213, and 214 are installed in the storage device 210, and a plurality of HDDs 311, 312, 313, and 314 are installed in the storage device 310. In each of the storage devices 110, 210, and 310, a RAID (Redundant Arrays of Inexpensive Disks) system (specifically, a RAID5 system) is realized by the plurality of HDDs installed in the storage device.

Each of the disk nodes 100, 200, and 300 manages data stored in one of the storage devices 110, 210, and 310 connected to the disk node, and supplies the data to terminals 21, 22, and 23 through the network 10. In addition, the data managed by the disk nodes 100, 200, and 300 have redundancy. That is, identical data are managed by at least two disk nodes.

The control node 500 controls the disk nodes 100, 200, and 300. For example, when the control node 500 is informed by one of the disk nodes 100, 200, and 300 of connection of a new storage device, the control node 500 defines a new virtual disk in order to enable access to data stored in the storage device through the virtual disk.

The terminals 21, 22, and 23 are connected to the access nodes 600 and 700 through a network 20. The virtual disk is defined in the access nodes 600 and 700. When one of the access nodes 600 and 700 receives from one of the terminals 21, 22, and 23 a request to access data in the virtual disk, the access node accesses the data being managed by the disk nodes 100, 200, and 300 and corresponding to the data in the virtual disk.

The management node 30 is a computer for use for management of the multinode storage system by an administrator. For example, the management node 30 collects information such as the operational status of the storage devices, and displays the collected information on a screen. When the administrator refers to the displayed information and finds a storage device for which recovery processing is necessary, the administrator inputs into the management node 30 an instruction to perform the recovery processing for the storage device. Then, the management node 30 sends to the control node 500 a request for recovery with a designation of the storage device.

2.2 Hardware

Figure 3:
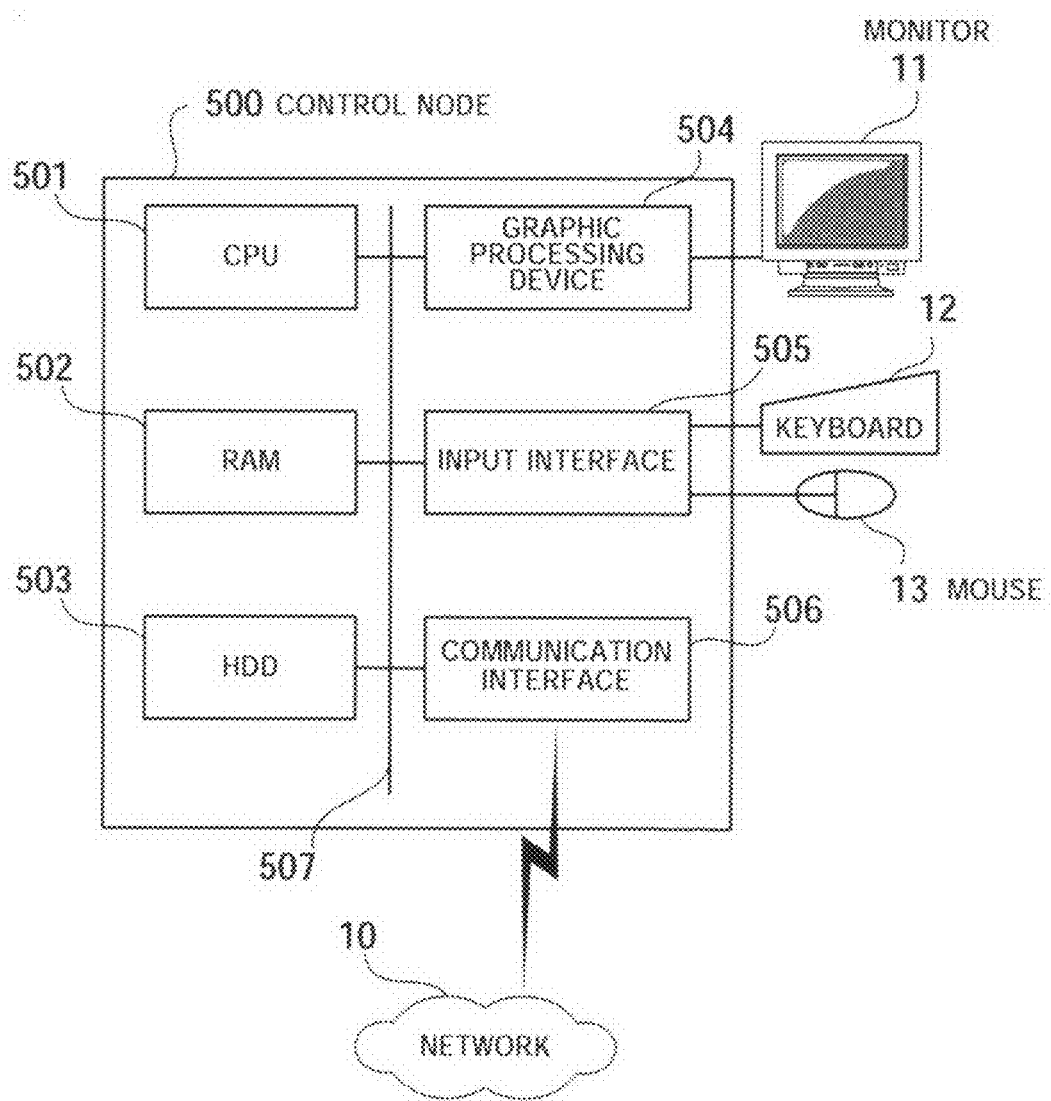
FIG. 3 illustrates an example of a hardware construction of a control node used in the first embodiment.

FIG. 3 is a diagram illustrating an example of a hardware construction of the control node 500 used in the first embodiment. The entire control node 500 is controlled by a CPU (central processing unit) 501, to which a RAM (random access memory) 502, a HDD (hard disk drive) 503, a graphic processing unit 504, an input interface 505, and a communication interface 506 are connected through a bus 507. The RAM 502 is used as a main memory of the control node 500. The RAM 502 temporarily stores at least portions of an OS (operating system) program and application programs which are executed by the CPU 501, as well as various types of data necessary for processing by the CPU 501. The HDD 503 is used as a secondary memory of the control node 500. The HDD 503 stores the OS program, the application programs, and the various types of data. Alternatively, a semiconductor memory device such as a flash memory can be used as the secondary memory.

A monitor 11 is connected to the graphic processing unit 504, which makes the monitor 11 display an image on a screen in accordance with an instruction from the CPU 501. The graphic processing device 504 makes the monitor 11 display an image on a screen in accordance with an instruction from the CPU 501. The monitor 11 may be a display device using a CRT (cathode ray tube) or liquid crystal. A keyboard 12 and a mouse 13 are connected to the input interface 505, which transmits signals sent from the keyboard 12 and the mouse 13, to the CPU 501 through the bus 507. The mouse 13 is a kind of pointing device, and may be replaced with another pointing device such as a touchscreen, a graphic tablet, a touchpad, or a trackball.

The communication interface 506 is connected to the network 10, so that the control node 500 can exchange data through the communication interface 506 and the network 10 with other computers.

Further, each of the disk nodes 100, 200, and 300, the access nodes 600 and 700, and the management node 30 can also be realized by a similar hardware construction to the control node 500 except that the disk nodes 100, 200, and 300 have further interfaces for external connection with the storage devices 110, 210, and 310, respectively.

The functions for performing the processing according to the first embodiment can be realized by using the hardware constructions explained above.

2.3 Virtual Disk

The data structure of the virtual disk defined in the multinode storage system according to the first embodiment is explained below.

Figure 4:
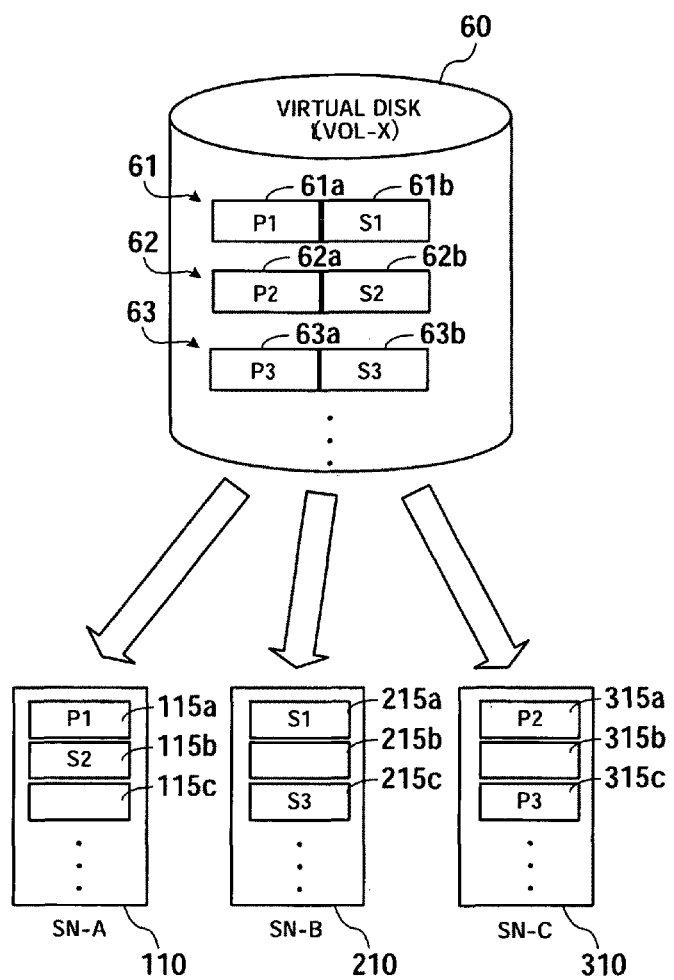
FIG. 4 illustrates an example of a data structure in a virtual disk in the first embodiment.

FIG. 4 illustrates an example of a data structure in the virtual disk in the first embodiment. In the example explained below, it is assumed that a virtual disk identifier "LVOL-X" is assigned to the virtual disk 60, and node identifiers "SN-A", "SN-B", and "SN-C" are respectively assigned to the disk nodes 100, 200, and 300 connected through the network. In addition, each of the storage devices 110, 210, and 310 (respectively connected to the disk nodes 100, 200, and 300) can be uniquely identified in the network 10 by a combination of the node identifier (node ID) and a disk identifier (disk ID), where the disk identifier is defined in each of the disk nodes 100, 200, and 300.

As mentioned before, a RAID5 storage system is realized in each of the storage devices 110, 210, and 310. The storage functions of the storage device 110 are split into a plurality of slices 115a, 115b, 115c, . . . , the storage functions of the storage device 210 are split into a plurality of slices 215a, 215b, 215c, . . . , the storage functions of the storage device 310 are split into a plurality of slices 315a, 315b, 315c, . . . , and the storage functions are managed on a slice-by-slice basis. On the other hand, the virtual disk 60 is constituted by segments 61, 62, 63, . . . , and each segment has the same storage capacity as each slice in the storage devices 110, 210, and 310. (For example, when the storage capacity of each slice is one gigabyte, the storage capacity of each segment is one gigabyte.) The storage capacity of the virtual disk 60 is an integer multiple of the storage capacity of each segment.

Each segment is constituted by a slice pair (i.e., a set of a primary slice and a secondary slice). (Specifically, the segment 61 is constituted by the primary slice 61a and the secondary slice 61b, the segment 62 is constituted by the primary slice 62a and the secondary slice 62b, and the segment 63 is constituted by the primary slice 63a and the secondary slice 63b.) The two slices belonging to each segment correspond to slices belonging to different disk nodes. In the memory area for use in management of each slice constituting a segment, the corresponding virtual-disk identifier (virtual-disk ID), segment information indicating the corresponding segment, slice information indicating the corresponding slice which constitutes the same segment, and a flag indicating, for example, whether each slice is a primary slice or a secondary slice are stored.

In the example of FIG. 4, each slice in the virtual disk 60 is identified by an identifier which is the character "P" or "S" followed by a number indicating a segment of the virtual disk 60, where the character "P" stands for the primary slice, and the character "S" stands for the secondary slice. For example, the primary slice in the first segment 61 is identified by the identifier "P1," and the secondary slice in the first segment 61 is identified by the identifier "S1."

2.4 Functions of Multinode Storage System

Figure 5:
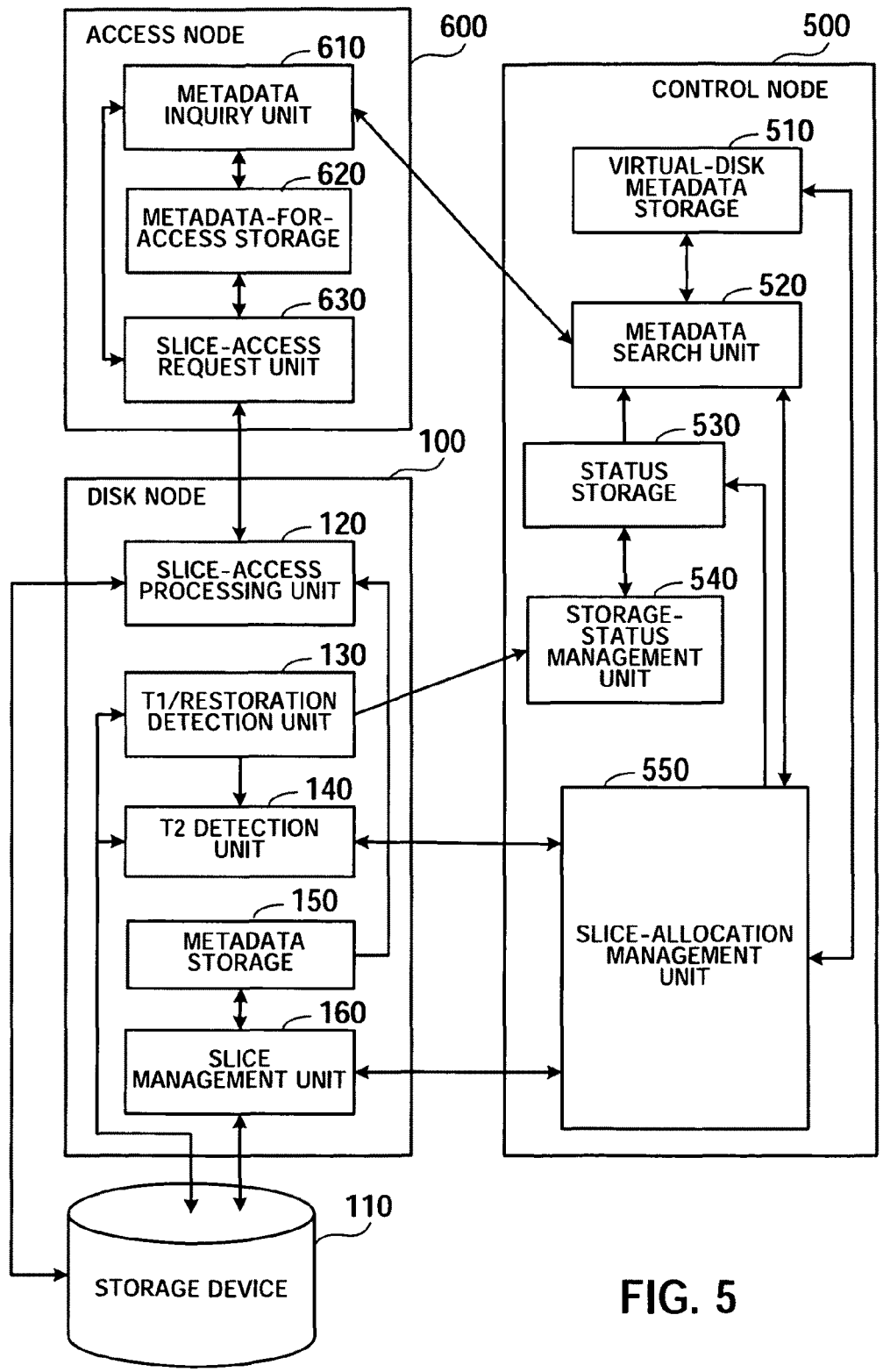
FIG. 5 is a block diagram illustrating the functions of the respective devices constituting the multinode storage system according to the first embodiment.

FIG. 5 is a block diagram illustrating the functions of the respective devices constituting the multinode storage system according to the first embodiment. The access node 600 comprises a metadata inquiry unit 610, a metadata-for-access storage 620, and a slice-access request unit 630.

The metadata inquiry unit 610 acquires from the control node 500 metadata defining the virtual disk 60. Specifically, when the access node 600 is started up, the metadata inquiry unit 610 transmits to the control node 500 an inquiry for all the metadata. Then, the control node 500 sends to the access node 600 all the metadata on the virtual disk 60. In addition, when data access to an arbitrary slice by the slice-access request unit 630 becomes an error, the metadata inquiry unit 610 transmits to the control node 500 an inquiry for the metadata on a segment to which the slice as the object to be accessed is allocated. Then, the control node 500 transmits the latest metadata on the segment to the access node 600. The metadata inquiry unit 610 in the access node 600 acquires the metadata from the control node 500, and stores the metadata in the metadata-for-access storage 620.

The metadata-for-access storage 620 is a function of storing the metadata defining the virtual disk 60. For example, part of the storage area of the RAM in the access node 600 can be used as the metadata-for-access storage 620. According to the first embodiment, the access node 600 accesses a primary slice on every occasion. Therefore, it is sufficient that the metadata-for-access storage 620 store the metadata on at least the primary slice out of the entire metadata on the virtual disk 60.

When the slice-access request unit 630 receives from one of the terminals 21, 22, and 23 a request to access data in the virtual disk, the slice-access request unit 630 transmits to the disk node 100, 200, or 300 a request to access (read or write) the data in the storage device 110, 210, or 310 according to the request to access data in the virtual disk. (Hereinafter, the request to access data may also be referred to as the access request.) Specifically, when the slice-access request unit 630 receives an access request in which an address in the virtual disk is designated, the slice-access request unit 630 refers to the metadata-for-access storage 620, and determines the segment to which the data to be accessed belongs. Subsequently, the slice-access request unit 630 determines the slice which is allocated for the primary slice in the determined segment. Then, the slice-access request unit 630 transmits a request to access the data in the determined slice, to the disk node managing the determined slice. When the slice-access request unit 630 receives from the disk node a response indicating the result of the access, the slice-access request unit 630 transmits the result of the access to the one of the terminals 21, 22, and 23.

When the disk node corresponding to the object to be accessed informs the slice-access request unit 630 of an error, the slice-access request unit 630 informs the metadata inquiry unit 610 of the segment in which the error occurs. Then, the slice-access request unit 630 makes a second attempt (retry) at the access. The processing in the second attempt at the access begins from the operation of determining the slice which is allocated for the primary slice by reference to the metadata-for-access storage 620. Therefore, in the case where the metadata in the metadata-for-access storage 620 is updated after the access request (at the first attempt), the disk node corresponding to the object to be accessed in the second attempt at the access is determined on the basis of the updated metadata.

The disk node 100 comprises a slice-access processing unit 120, a T1/restoration detection unit 130, a T2 detection unit 140, a metadata storage 150, and a slice management unit 160.

The slice-access processing unit 120 performs data access to the storage device 110 in response to an access request from the access node 600. Specifically, when the slice-access processing unit 120 receives an access request transmitted from the access node 600, the slice-access processing unit 120 refers to the metadata storage 150, and determines the slice in the storage device 110 which is allocated to the segment as the object to be accessed. Then, the slice-access processing unit 120 accesses the data in the slice designated in the access request. For example, when the access request is a data read request, the slice-access processing unit 120 reads out the corresponding data from the storage device 110. When the access request is a data write request, the slice-access processing unit 120 writes the data contained in the access request, in the corresponding area of the storage device 110. Thereafter, the slice-access processing unit 120 transmits the result of the access to the access node 600. When the access request is a data read request, the result of the access includes the data read out from the storage device 110. When the storage device 110 is in such a situation that the storage device 110 cannot return a response to the access (which is similar to the situation in which the storage device 110 cannot return a response to an inspection command), the slice-access processing unit 120 returns an error message to the access node 600.

The T1/restoration detection unit 130 periodically transmits an inspection command to the storage device 110, and determines whether or not a possibility of failure of the storage device 110 exists, on the basis of the presence or absence of a response to the inspection command. Specifically, the T1/restoration detection unit 130 periodically issues an inspection command such as the "test unit ready" command to the storage device 110. In addition, the T1/restoration detection unit 130 holds the value of the irregularity-detection reference time T1. For example, the value of the irregularity-detection reference time T1 is set in the RAM used by the T1/restoration detection unit 130, and the value of the irregularity-detection reference time T1 may be in the range from a few seconds to ten-odd seconds. When no response is returned from the storage device 110 even after the irregularity-detection reference time T1 elapses since the issue of the inspection command, the T1/restoration detection unit 130 determines that a possibility of failure of the storage device 110 exists, and transmits to the control node 500 a notice of an elapse of the irregularity-detection reference time T1. In addition, when a response is returned from the storage device 110 after the irregularity-detection reference time T1 elapses since the issue of the inspection command, the T1/restoration detection unit 130 transmits a notice of restoration to the control node 500.

The T2 detection unit 140 determines whether or not the storage device 110 is faulty, after the T1/restoration detection unit 130 determines that a possibility of failure of the storage device 110 exists. Specifically, the T2 detection unit 140 holds the value of the failure-detection reference time T2, which is greater than the irregularity-detection reference time T1. For example, the value of the failure-detection reference time T2 is set in the RAM used by the T2 detection unit 140, and the value of the failure-detection reference time T2 may be in the range from approximately thirty seconds to one minute. When no response is returned from the storage device 110 even after the failure-detection reference time T2 elapses since the issue of the inspection command by the T1/restoration detection unit 130, the T2 detection unit 140 definitely determines that the storage device 110 is faulty, and transmits to the control node 500 a notice of an elapse of the failure-detection reference time T2.

The metadata storage 150 is a function of storing the metadata on the slices managed by the disk node 100. For example, part of the storage area of the RAM in the disk node 100 can be used as the metadata storage 150.

The slice management unit 160 manages the metadata on each slice in the storage device 110. Specifically, when the disk node 100 is started up, the slice management unit 160 reads out the metadata on each slice from the storage device 110, and stores the metadata on each slice in the metadata storage 150. In addition, when a request to collect metadata is received from the control node 500, the slice management unit 160 transmits to the control node 500 the metadata stored in the metadata storage 150. Further, when a request to change metadata is received from the control node 500, the slice management unit 160 changes the metadata (stored in both of the metadata storage 150 and the storage device 110) according to the request to change the metadata.

The control node 500 comprises a virtual-disk metadata storage 510, a metadata search unit 520, a status storage 530, a storage-status management unit 540, and a slice-allocation management unit 550.

The virtual-disk metadata storage 510 is a function of storing the metadata indicating allocation of slices to the segments constituting the virtual disk 60. For example, part of the storage area of the RAM 502 can be used as the virtual-disk metadata storage 510.

The metadata search unit 520 searches the virtual-disk metadata storage 510 for the metadata on slices allocated to a segment about which the access node 600 inquires, and returns to the access node 600 the result of the search as a response. In addition, when it is determined that a possibility of failure of a storage device containing the slice requested by the access node 600 exists, the metadata search unit 520 requests the slice-allocation management unit 550 to reallocate a slice to the segment. (At this time, the metadata search unit 520 determines the status of each storage device by reference to the status storage 530.) Then, the metadata search unit 520 acquires from the virtual-disk metadata storage 510 the metadata in which the slice reallocation is reflected, and returns to the access node 600 the acquired metadata as a response.

The status storage 530 is a function of storing the status of each of the storage devices 110, 210, and 310 connected to the disk nodes 100, 200, and 300. For example, part of the storage area of the RAM 502 can be used as the status storage 530. The status of each of the storage devices 110, 210, and 310 set in the status storage 530 is the normal state or the state after an elapse of T1 (i.e., the state after the elapse of the irregularity-detection reference time T1 without a response to an inspection command). When the status of a storage device is the state after the elapse of T1, it is possible to recognize that a possibility of failure of the storage device exists.

The storage-status management unit 540 changes the status of the storage device 110 (which is stored in the status storage 530) according to a notice from the disk node 100. Specifically, when the storage-status management unit 540 receives from the disk node 100 a notice of an elapse of the irregularity-detection reference time T1, the storage-status management unit 540 changes the status of the storage device 110 (which is stored in the status storage 530) to the state after the elapse of T1. When the storage-status management unit 540 receives from the disk node 100 a notice of the recovery after detection of an elapse of the irregularity-detection reference time T1, the storage-status management unit 540 changes the status of the storage device 110 (which is stored in the status storage 530) to the normal state. Although only the disk node 100 is indicated in FIG. 5, the disk nodes 200 and 300 also have functions similar to the disk node 100, and the storage-status management unit 540 operates in a similar manner when the storage-status management unit 540 receives a notice of an elapse of the irregularity-detection reference time T1 or restoration from the disk node 200 or 300.

The slice-allocation management unit 550 manages the allocation of slices to the segments in the virtual disk 60. For example, when the slice-allocation management unit 550 is informed by the metadata search unit 520 of a slice as an object to be accessed in a storage device which is determined to be possibly faulty, the slice-allocation management unit 550 newly allocates another slice to the segment to which the slice in the possibly faulty storage device is allocated until then.

Further, when the slice-allocation management unit 550 receives from the disk node 100 a notice of an elapse of the failure-detection reference time T2, the slice-allocation management unit 550 starts recovery processing for one or more segments to which one or more slices in the storage device 110 are allocated. In the recovery processing, the slice-allocation management unit 550 changes the attributes of all the one or more slices in the storage devices other than the storage device 110 (i.e., the storage devices 210 and 310 in the first embodiment) which are allocated until then for one or more secondary slices in the one or more segments to be recovered, to one or more primary slices in the one or more segments. Then, the slice-allocation management unit 550 allocates one or more other slices in the storage devices 210 and 310 for the one or more secondary slices in the segment to be recovered. Thereafter, the slice-allocation management unit 550 transmits to the disk nodes 200 and 300 a request to update the metadata according to the above reallocations. When the disk nodes 200 and 300 complete the updating of the metadata, the slice-allocation management unit 550 updates the metadata stored in the virtual-disk metadata storage 510.

When the metadata is recovered by the recovery processing, each disk node managing one or more primary slices in the one or more recovered segment copies the data in the one or more primary slices into the one or more secondary slices through the network 10. The copying of the data in the one or more primary slices in the recovery processing is performed by cooperation between the functions of or corresponding to the slice management unit 160 in the disk node managing the one or more primary slices and the disk nodes managing the one or more secondary slices.

Although only the functions of the access node 600 as a representative of the two access nodes 600 and 700 are indicated in FIG. 5, the access node 700 also has functions similar to the access node 600. In addition, although only the functions of the disk node 100 as a representative of the three disk nodes 100, 200, and 300 are indicated in FIG. 5, the other disk nodes 200 and 300 also have functions similar to the disk node 100.

2.5 Metadata

Next, the metadata managed in each node in the multinode storage system are explained in detail. The metadata in the first embodiment are stored in the storage devices 110, 210, and 310 while the multinode storage system is not in operation. When the multinode storage system is started up, the metadata are read out from the storage devices 110, 210, and 310 and stored in the respective nodes.

Figure 6:
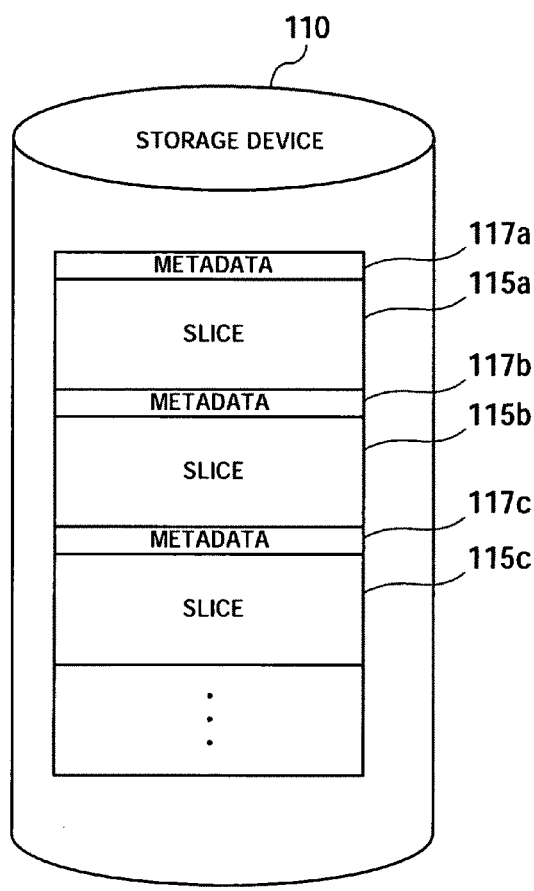
FIG. 6 illustrates an example of a data structure in a storage device in the first embodiment.

FIG. 6 illustrates an example of a data structure in the storage device 110 in the first embodiment. The storage device 110 stores records of metadata 117a, 117b, 117c, ... as well as the slices 115a, 115b, 115c, .... When the disk node 100 is started up, the slice management unit 160 reads out the records of metadata 117a, 117b, 117c, ... from the storage device 110, and stores the records of metadata 117a, 117b, 117c, ... in the metadata storage 150.

Figure 7:
FIG. 7 illustrates an example of a data structure in a metadata storage in the first embodiment.

FIG. 7 illustrates an example of a data structure in the metadata storage 150 in the disk node 100 in the first embodiment. The metadata storage 150 stores a metadata table 151. The metadata table 151 has the columns of "Disk-node ID," "Disk ID," "Slice ID," "Status," "Virtual-disk ID," "Segment ID," "Virtual-disk Address," "Pairing Disk-node ID," "Pairing Disk ID," "Pairing Slice ID," and "Time Stamp." The information items tabulated in each row of the metadata table 151 are associated with each other, and constitute a record of metadata on a slice.

The disk-node ID is set in the column "Disk-node ID." The disk-node ID is information for identification of each disk node (e.g., the disk node 100 managing the storage device 110). The disk ID is set in the column "Disk ID." The disk ID is information for identification of each storage device connected to a disk node (e.g., the disk node 100). Although only one storage device (e.g., the storage device 110) is connected to each disk node (e.g., the disk node 100) in the first embodiment, a different disk ID is set for a storage device in the case where more than one storage device is connect to the disk node. The slice ID is set in the column "Slice ID." The slice ID is information for identification of the slice corresponding to each record of metadata. The status flag, which indicates the status of the slice, is set in the column "Status." When the slice corresponding to a record of metadata is not allocated to any segment in the virtual disk, the status flag "F" is set in the column "Status." When the slice corresponding to a record of metadata is allocated for the primary slice of a segment of the virtual disk, the status flag "P" is set in the column "Status." When the slice corresponding to a record of metadata is allocated for the secondary slice of a segment of the virtual disk, the status flag "S" is set in the column "Status." When the slice corresponding to a record of metadata is determined to be allocated to a segment of the virtual disk, and copying of the data into the slice is not yet performed, the status flag "R" (which stands for "reserved") is set in the column "Status." When a segment to which the slice corresponding to the record of metadata is allocated is determined to be an abnormal segment, the status flag "B" (which stands for "bad") is set in the column "Status." The virtual-disk ID is set in the column "Virtual-disk ID." The virtual-disk ID is information for identification of the virtual disk including the segment to which the slice corresponding to each record of metadata is allocated. The segment ID is set in the column "Segment ID." The segment ID is information for identification of the segment to which the slice corresponding to each record of metadata is allocated. The leading address, in the virtual disk, of the segment to which the slice corresponding to each record of metadata is allocated is set in the column "Virtual-disk Address." The pairing disk-node ID is set in the column "Pairing Disk-node ID." The pairing disk-node ID is information for identification of the disk node managing the storage device containing the slice paired, in the same segment, with the slice corresponding to each record of metadata (i.e., the other slice allocated to the same segment). The pairing disk ID is set in the column "Pairing Disk ID." The pairing disk ID is information for identification, in the disk node identified by the pairing disk-node ID, of the storage device containing the slice paired with the slice corresponding to each record of metadata. The pairing slice ID is set in the column "Pairing Slice ID." The pairing slice ID is information for identification, in the storage device identified by the pairing disk ID, of the slice paired with the slice corresponding to each record of metadata. The time at which the slice corresponding to each record of metadata is allocated to a segment is set as the time-stamp value in the column "Time Stamp." In this specification, the time-stamp value is indicated by the character "t" followed by a natural number such as "1" or "2," and greater natural numbers correspond to later times.

Although FIG. 7 shows an example of a data structure in the metadata storage 150 in the storage device 110, the other disk nodes 200 and 300 also have a metadata storage similar to the metadata storage 150. The metadata stored in the metadata storage in each of the disk nodes 100, 200, and 300 are transmitted to the control node 500 in response to a request from the control node 500, and the metadata collected from the disk nodes 100, 200, and 300 are stored in the virtual-disk metadata storage 510 by the slice-allocation management unit 550.

FIG. 8 illustrates an example of a data structure in the virtual-disk metadata storage 510. The virtual-disk metadata storage 510 stores a virtual-disk metadata table 511. The virtual-disk metadata table 511 also has the columns of "Disk-node ID," "Disk ID," "Slice ID," "Status," "Virtual-disk ID," "Segment ID," "Virtual-disk Address," "Pairing Disk-node ID," "Pairing Disk ID," "Pairing Slice ID," and "Time Stamp." The information items tabulated in each row of the virtual-disk metadata table 511 are associated with each other, and constitute a record of metadata. The information items set in the above columns in the virtual-disk metadata table 511 are respectively similar to the identically denoted information items in the metadata table 151.

The metadata stored in the virtual-disk metadata table 511 in the metadata storage 510 are transmitted to the access node 600 or 700 in response to a request from the access node 600 or 700. When the access node 600 acquires the metadata from the virtual-disk metadata table 511, the access node 600 stores the acquired metadata in the metadata-for-access storage 620. When the access node 700 acquires the metadata from the virtual-disk metadata table 511, the access node 700 stores the acquired metadata in a storage function similar to the metadata-for-access storage 620.

The data structure in the metadata-for-access storage 620 is similar to the virtual-disk metadata storage 510. In the first embodiment, the access node 600 accesses the primary slices at every occasion. Therefore, it is sufficient that the metadata-for-access storage 620 store metadata on at least the primary slices. The information items in the columns of "Pairing Disk-node ID," "Pairing Disk ID," "Pairing Slice ID," and "Time Stamp" may be dispensed with in the metadata-for-access storage 620.

2.6 Status Storage

Figure 9:
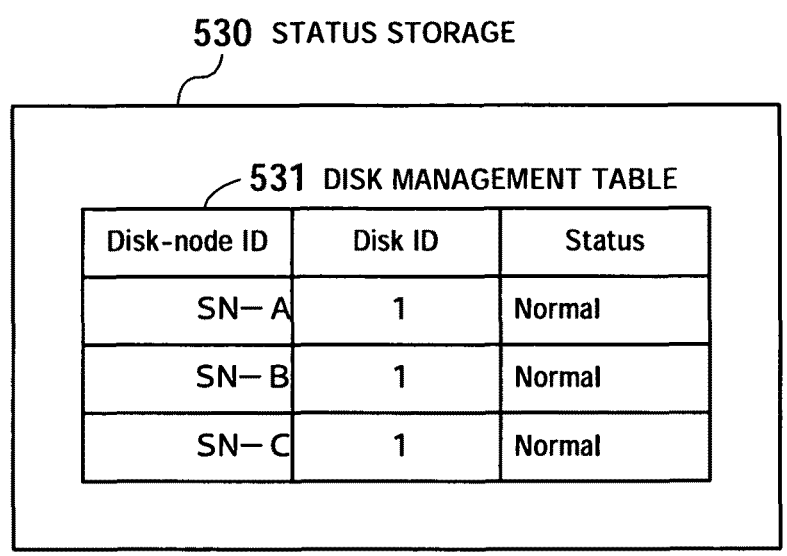
FIG. 9 illustrates an example of a data structure in a status storage in the first embodiment.

FIG. 9 illustrates an example of a data structure in the status storage 530 in the first embodiment. The status storage 530 stores a disk management table 531. The disk management table 531 has the columns of "Disk-node ID," "Disk ID," and "Status."

The disk-node ID is set in the column "Disk-node ID." The disk-node ID is information for identification of each disk node. The disk ID is set in the column "Disk ID." The disk ID is information for identification of each storage device connected to the disk node. The status of each storage device is set in the column "Status." The status of each storage device is the normal state or the state after an elapse of T1. The normal state is the state in which, the storage device normally operates. Specifically, while the storage device returns a response to an inspection command which is periodically transmitted from the disk node, the status of the storage device is set to "Normal" in the status storage 530. The state after an elapse of T1 is the state in which a possibility of failure of the storage device exists. Specifically, when a storage device does not return a response to an inspection command transmitted from a disk node until an elapse of the irregularity-detection reference time T1, the status of the storage device is set to "T1" in the status storage 530.

2.7 Processing

In the multinode storage system according to the first embodiment as described above, when a storage device does not return a response to an inspection command transmitted from a disk node until an elapse of the irregularity-detection reference time T1, the following processing for reallocating a slice is performed.

Figure 10:
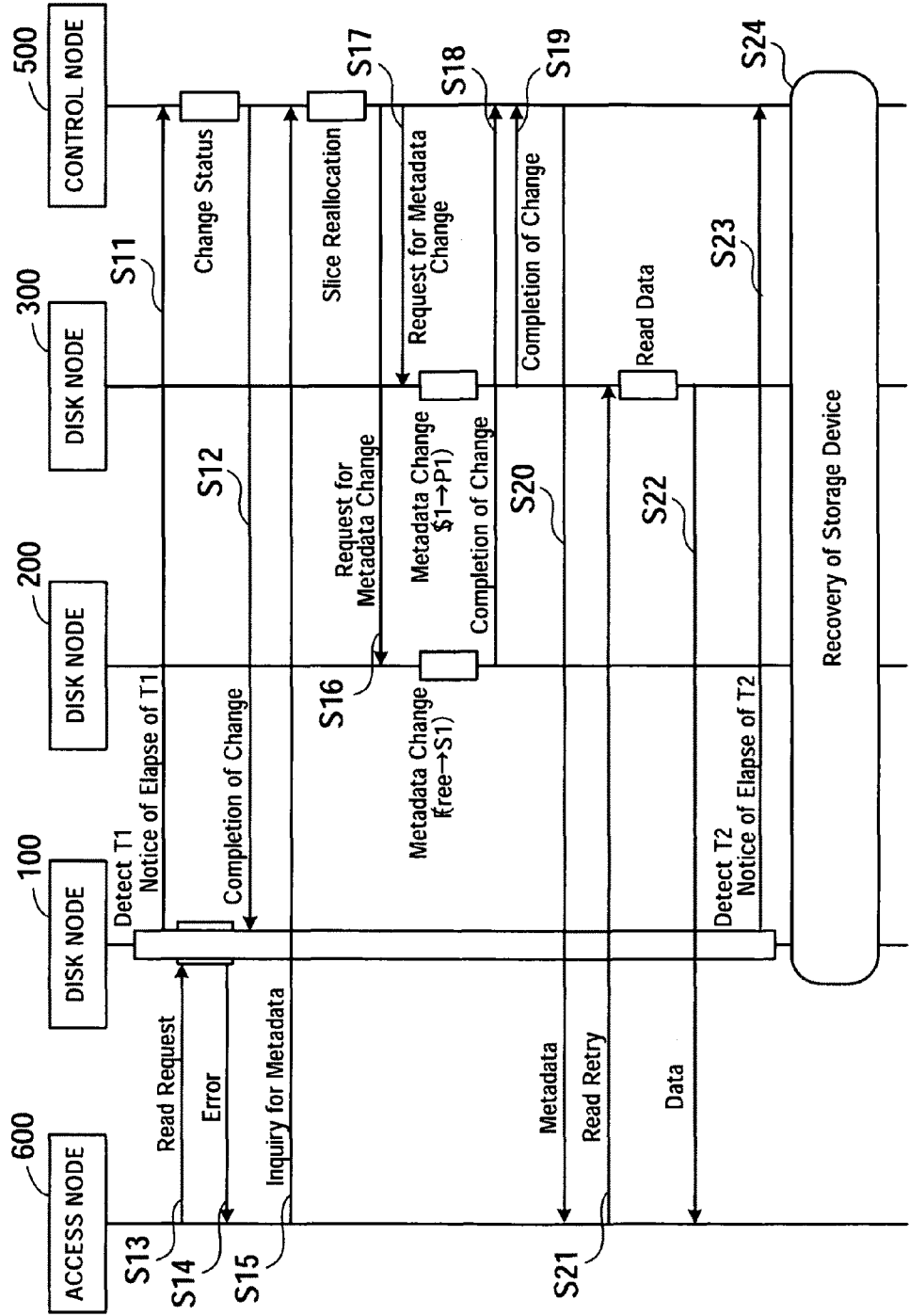
FIG. 10 is a sequence diagram indicating a sequence of processing for slice reallocation which is performed when a storage device fails in the first embodiment.

FIG. 10 is a sequence diagram indicating a sequence of processing for slice reallocation which is performed when a storage device fails in the first embodiment. The processing of FIG. 10 is explained below step by step. In the example explained below, it is assumed that the storage device 110 connected to the disk node 100 fails.

<Step S11> The T1/restoration detection unit 130 in the disk node 100 periodically performs disk diagnosis (operational checking) of the storage device 110. Specifically, the T1/restoration detection unit 130 periodically issues an inspection command "test unit ready" to the storage device 110. When the storage device 110 normally operates, the storage device 110 returns a response in the irregularity-detection reference time T1. For example, when the storage device 110 is faulty, or when the storage device 110 is internally performing data reproduction processing, the storage device 110 does not return a response in the irregularity-detection reference time T1. The data reproduction processing is performed when a disk constituting the RAID5 system fails. As illustrated in FIG. 2, the HDDs 111 to 114 are installed in the storage device 110 and constitute the RAID5 system. In the RAID5 system, striping is performed. In the striping, data is split into a plurality of stripes stored in a plurality of HDDs. At this time, parity data for use in restoring data is produced, and stored in an HDD different from the HDDs in which the stripes of the corresponding data are stored. When one of the plurality of HDDs in the storage device 110 fails, the data stored in the failed HDD are reproduced by use of the parity data.

The above data reproduction processing is automatically executed in the storage device 110. For example, one of the HDDs 111 to 114 fails, a RAID controller in the storage device 110 reproduces data stored in the failed HDD. In addition, since the number of the HDDs in operation is reduced to three, the RAID controller rearranges the striped data. The loads imposed on the RAID controller in the storage device 110 during the processing for the data reproduction and rearrangement is greater than usual. Therefore, when an inspection command is inputted from the disk node 100 into the storage device 110 during data reproduction processing, in some cases, it takes greater time to return a response than usual. However, since the data reproduction processing is one of normal operations of the storage device 110, the delay in responding to an inspection command during the data reproduction processing does not mean failure of the storage device 110.

Since it is assumed that the storage device 110 connected to the disk node 100 fails in the example of FIG. 10, no response to the inspection command is returned even when the irregularity-detection reference time T1 elapses since the issue of the inspection command. Therefore, the T1/restoration detection unit 130 detects the elapse of the irregularity-detection reference time T1. When the T1/restoration detection unit 130 detects the elapse of the irregularity-detection reference time T1, the T1/restoration detection unit 130 transmits to the control node 500 a notice of the elapse of the irregularity-detection reference time T1, which contains the disk-node ID of the disk node 100 and the disk ID of the storage device 110. Thereafter, the T1/restoration detection unit 130 waits for a response from the storage device 110.

When the control node 500 receives the notice of an elapse of the irregularity-detection reference time T1, the storage-status management unit 540 in the control node 500 changes the status of the storage device 110. Specifically, the storage-status management unit 540 searches the status storage 530 for information corresponding to the combination of the disk-node ID and the disk ID contained in the notice of the elapse of the irregularity-detection reference time T1, and then changes the status of the corresponding storage device indicated in the information searched for, to the state after an elapse of T1. FIG. 11 indicates examples of the contents of the status storage 530 after a status change in the first embodiment. As illustrated in FIG. 11, the status corresponding to the combination of the disk-node ID "SN-A" and the disk ID "1" is changed to the state after an elapse of T1 (indicated by "T1"). Thus, the control node 500 can recognize that a possibility of failure of the storage device 110 connected to the disk node 100 exists.

The explanation goes on with reference to FIG. 10.

<Step S12> When the change of the status is completed, the storage-status management unit 540 transmits to the disk node 100 a response indicating the completion of the change.

<Step S13> When a request for access to data in the virtual disk 60 occurs in response to a user's manual input into one of the terminals 21, 22, and 23, the slice-access request unit 630 in the access node 600 refers to the metadata-for-access storage 620, and determines the disk node managing the data to be accessed. (In the example of FIG. 10, it is assumed that read access to a slice managed by the disk node 100 occurs.) Then, the slice-access request unit 630 transmits to the disk node 100 a (data read) request to read the data to be accessed. The slice-access processing unit 120 in the disk node 100 refers to the metadata storage 150, confirms that the slice to be accessed is a slice in the storage device 110 managed by the disk node 100, and performs read access designating the data in the slice in the storage device 110.

In the example of FIG. 10, a data read request is outputted from the access node 600 after the T1/restoration detection unit 130 detects an elapse of the irregularity-detection reference time T1. Since the storage device 110 fails in the example of FIG. 10, the access to the storage device 110 becomes an error. That is, even in the case where the elapse of the irregularity-detection reference time T1 is caused by the overload on the storage device 110, data access to the storage device 110 becomes an error until a response to the inspection command is detected and the storage device 110 is restored.

The data read request becomes an error only when the storage device containing the primary slice has a problem (such as failure or overload). On the other hand, the data write request becomes an error when either of the storage device containing the primary slice and the storage device containing the secondary slice has a problem (such as failure or overload). That is, when the disk node 100 receives an access request to write data, first, the slice-access processing unit 120 updates the data in the slice (primary slice). Thereafter, the slice management unit 160 refers to the metadata storage 150, and determines the slice (secondary slice) which is paired with the slice (primary slice). Then, the slice management unit 160 transmits the data to be written, to the disk node managing the secondary slice, and requests updating of the data in the secondary slice. After the slice-access processing unit 120 confirms completion of the updating of the data in both of the primary slice and the secondary slice, the slice-access processing unit 120 returns to the access node 600 a response indicating the completion of the write request. When the updating of the data fails in either of the primary slice and the secondary slice, the slice-access processing unit 120 returns to the access node 600 a response indicating an error.

Since the storage device 110 (corresponding to the disk-node ID "SN-A" and having the disk ID "1") fails in the example of FIG. 10, the read request to read the data in the leading slice (having the slice ID "1") in the storage device 110 becomes an error.

<Step S14> The slice-access processing unit 120 in the disk node 100 returns a response, indicating the error, to the read request from the access node 600. Then, the slice-access request unit 630 in the access node 600 informs the metadata inquiry unit 610 of the occurrence of the error. At this time, the slice-access request unit 630 informs the metadata inquiry unit 610 of the virtual-disk ID and the segment ID of the segment the access to which becomes an error.

<Step S15> The metadata inquiry unit 610 transmits to the control node 500 an inquiry for metadata designating the above segment. The designated segment (i.e., the segment about which the inquiry is made) is the segment the access to which becomes an error. That is, the inquiry for metadata designating the segment indicates that access to the slice allocated to the designated segment fails.

When the control node 500 receives the inquiry for metadata, the metadata search unit 520 in the control node 500 requests the slice-allocation management unit 550 to reallocate a slice to the designated segment. Specifically, when the control node 500 receives an inquiry for metadata, the metadata search unit 520 searches the virtual-disk metadata storage 510 for the metadata on the slices (the primary slice and the secondary slice) allocated to the designated segment. Then, the metadata search unit 520 refers to the status storage 530, and checks the status of the storage devices containing the slices allocated to the designated segment. When the status of the storage device containing each slice is the normal state, the metadata search unit 520 transmits to the access node 600 the metadata on the primary slice extracted from the metadata acquired by the search.

When the status of the storage device containing one of the primary slice and the secondary slice is the state after an elapse of the irregularity-detection reference time T1, the recovery processing for the designated segment (i.e., the processing for recovering the redundancy) is started. In the recovery processing, the metadata search unit 520 reallocates a slice to the designated segment. For example, when the status of the storage device containing the primary slice of the designated segment is the state after an elapse of the irregularity-detection reference time T1, the metadata search unit 520 reallocates a slice for the primary slice. When the status of the storage device containing the secondary slice of the designated segment is the state after an elapse of the irregularity-detection reference time T1, the metadata search unit 520 reallocates a slice for the secondary slice.

Since the status of the storage device 110 in the example of FIG. 10 is the state after an elapse of the irregularity-detection reference time T1, reallocation of the primary slice is performed. Specifically, the metadata search unit 520 outputs to the slice-allocation management unit 550 a request to reallocate a slice for the primary slice designating the segment in the virtual disk. Then, the slice-allocation management unit 550 searches the virtual-disk metadata storage 510 for one of free slices managed by the disk nodes other than the disk node managing the secondary slice in the designated segment, where the free slices are slices which are not allocated to any segment in the virtual disk, and the status of which is indicated by the status flag "F."

Thereafter, the slice-allocation management unit 550 determines the one of free slices searched for to be allocated for the secondary slice in the designated segment. In addition, the slice-allocation management unit 550 determines to change the status of the slice which is allocated for the secondary slice in the designated segment. In the example of FIG. 10, the slice-allocation management unit 550 determines to allocate a slice managed by the disk node 200 for the secondary slice in the designated segment, and change the status of the slice managed by the disk node 300, from the secondary slice to the primary slice. The slice-allocation management unit 550 updates the metadata in the virtual-disk metadata storage 510 on the basis of information on the determined reallocation.

<Step S16> The slice-allocation management unit 550 transmits to the disk node 200 a request to change metadata. Specifically, the slice-allocation management unit 550 transmits to the disk node 200 information on the metadata on the secondary slice after the reallocation. Then, the disk node 200 changes the metadata held in the disk node 200 and the metadata stored in the storage device 210, on the basis of the information transmitted from the slice-allocation management unit 550. Thus, the status of a free slice in the storage device 210 is changed to the secondary slice in the segment designated in the inquiry for metadata.

<Step S17> The slice-allocation management unit 550 transmits to the disk node 300 a request to change metadata. Specifically, the slice-allocation management unit 550 transmits to the disk node 300 information on the metadata on the primary slice after the reallocation. Then, the disk node 300 changes the metadata held in the disk node 300 and the metadata stored in the storage device 310, on the basis of the information transmitted from the slice-allocation management unit 550. Thus, a slice in the storage device 310 which is allocated until then for the secondary slice in the designated segment is newly allocated for the primary slice in the designated segment.

<Step S18> The disk node 200 transmits to the control node 500 a response indicating completion of the change in the metadata.

<Step S19> The disk node 300 transmits to the control node 500 a response indicating completion of the change in the metadata.

Although not indicated in FIG. 10, when the processing for changing the metadata is completed in the disk nodes 200 and 300, copying of data for recovering the redundancy in the designated segment is started. Specifically, the data in the slice in the disk node 300 corresponding to the primary slice of the designated segment after the change of the metadata is transferred from the disk node 300 to the disk node 200, and stored in the slice in the disk node 200 which is newly allocated for the secondary slice in the designated segment. When the copying of the data is completed, the recovery processing for the designated segment is completed.

As explained above, the slice reallocation is performed in response to an inquiry for metadata. At this time, the slice-allocation management unit 550 stores in the RAM 502 information on the segment for which the reallocation is performed in response to detection of the state of a storage device after an elapse of the irregularity-detection reference time T1. Specifically, the slice-allocation management unit 550 stores in the RAM 502 the combination of the virtual-disk ID and the segment ID of the reallocated segment. When the storage device is restored after the reallocation, the status of the slice in the restored storage device allocated to the designated segment before the reallocation is changed to the free slice.

FIG. 12 indicates examples of the contents of the virtual-disk metadata table 511 in the virtual-disk metadata storage 510 after the status change. In the virtual-disk metadata table 511 indicated in FIG. 12, the time-stamp value in each of the changed records of metadata is updated to "t(n+1)," where "t(n+1)" is the time of the updating. As indicated in FIG. 12, the status is changed to "F" in the record of metadata on the slice identified by the disk-node ID "SN-A," the disk ID "1," and the slice ID "1." That is, the above slice in the storage device 110 is deallocated from the designated segment (having the segment ID "1"). In addition, the status is changed to "P" in the record of metadata on the slice identified by the disk-node ID "SN-C," the disk ID "1," and the slice ID "1." That is, the status of the above slice in the storage device 310 allocated to the designated segment is changed from the secondary slice to the primary slice. Further, in the record of metadata on the slice identified by the disk-node ID "SN-B," the disk ID "1," and the slice ID "2," the status is changed to "S," and "VLOX-X" and "1" are set as the virtual-disk ID and the segment ID, respectively. That is, the above slice in the storage device 210 is allocated for the secondary slice in the designated segment.

Referring back to FIG. 10, when the updating of the metadata is completed, the slice-allocation management unit 550 informs the metadata search unit 520 of the completion of the slice reallocation.

<Step S20> The metadata search unit 520 transmits to the access node 600 the metadata on the primary slice in the designated segment. Then, the metadata inquiry unit 610 in the access node 600 updates the metadata in the metadata-for-access storage 620 on the basis of the metadata transmitted from the metadata search unit 520. Thereafter, the metadata inquiry unit 610 informs the slice-access request unit 630 of completion of the processing in response to the inquiry.

<Step S21> When the processing in response to the inquiry is completed, the slice-access request unit 630 refers to the metadata-for-access storage 620, determines a disk node managing the slice to be accessed, and transmits a second read request (for making a read retry) to the disk node 300 since, at this time, the primary slice to be accessed is the slice managed by the disk node 300.

<Step S22> When the disk node 300 receives the (second) read request, the disk node 300 reads out the data from the slice in the storage device 310, and transmits the data to the access node 600. Then, the slice-access request unit 630 receives the transmitted data, and transmits the received data to the terminal which instructs to access the data.

<Step S23> Since the storage device 110 fails in the example of FIG. 10, the storage device 110 returns no response even when the failure-detection reference time T2 elapses. Therefore, the T2 detection unit 140 in the disk node 100 detects the elapse of the failure-detection reference time T2. Then, the T2 detection unit 140 transmits to the control node 500 a notice of the elapse of the failure-detection reference time T2.

<Step S24> When the control node 500 receives the above notice of the elapse of the failure-detection reference time T2, the slice-allocation management unit 550 recognizes that the storage device 110 fails and cannot be used. Then, the slice-allocation management unit 550 starts processing for recovery of the entire storage device 110.

As explained above, even in the case where the storage device 110 fails, data in a segment to which a slice in the storage device 110 is allocated for the primary slice can be accessed before an elapse of the failure-detection reference time. Therefore, it is possible to reduce the time in which access by the access node 600 becomes an error.

Next, processing for slice reallocation which is performed in the case where a response to an inspection command is delayed because of transient overload during normal operation of the storage device 110 is explained below.

FIG. 13 is a sequence diagram indicating a sequence of processing for slice reallocation which is performed in the first embodiment when the load imposed on the storage device 110 is excessive. In the example of FIG. 13, it is assumed that the load imposed on the storage device 110 (connected to the disk node 100) is transiently excessive. The operations in steps S31 to S42 in FIG. 13 are similar to the operations in steps S11 to S22 in FIG. 10. Therefore, only the operations performed in step S43 and the following steps are explained below step by step.

<Step S43> The T1/restoration detection unit 130 receives from the storage device 110 a response to an inspection command, so that the T1/restoration detection unit 130 detects restoration of the storage device 110 to a state in which the storage device 110 can be accessed. Then, the T1/restoration detection unit 130 transmits to the control node 500 a notice of the restoration of the storage device 110.

<Step S44> When the control node 500 receives the notice of the restoration of the storage device 110, the slice-allocation management unit 550 in the control node 500 transmits to the disk node 100 a request to change metadata. Specifically, the slice-allocation management unit 550 refers to the virtual-disk metadata storage 510, and extracts a slice in the restored storage device 110 which has been allocated before the slice reallocation to the segment for which the slice reallocation in response to the inquiry for the metadata is completed. Then, the slice-allocation management unit 550 transmits to the disk node 100 a request to deallocate the extracted slice from the segment (i.e., a request to change the status of the extracted slice to the free state "F").

<Step S45> The slice management unit 160 in the disk node 100 updates in the metadata storage 150 the metadata on the designated slice on the basis of the request to change the metadata. After the metadata is updated, the slice management unit 160 transmits to the control node 500 a response indicating the completion of the change of the metadata.

As explained above, when the overloaded state of the storage device 110 is dissolved and the storage device 110 is restored, occurrence of inconsistency in the metadata can be prevented by the updating of the metadata on the storage device 110. Specifically, when the slice reallocation is performed in the metadata on a segment, slices in storage devices different from the storage device 110 are allocated for the primary slice and the secondary slice in the segment. Therefore, when the storage device 110 is restored, if the allocation of the slice in the restored storage device to the primary slice in the segment is also restored, more than one slice is allocated for a slice (the primary slice in the example of FIG. 13) in the segment after reallocation. Thus, inconsistency in the metadata is prevented by changing the status of the slice in the storage device 110 to the free state "F."

Incidentally, until restoration of the storage device 110 is confirmed, there is a possibility that the storage device 110 fails and the metadata cannot be normally updated. Therefore, the change of the metadata on the storage device 110 is made after the storage device 110 is restored. When the slice reallocation is performed, information indicating the segment for which the slice reallocation is performed is stored in the RAM in the control node 500, so that it is possible to determine the slice the status of which is to be changed to the free state when the storage device 110 is restored.

However, in some cases, a trouble can occur in the control node 500 before the storage device 110 is restored so that the data in the RAM 502 in the control node 500 can be lost. For example, when the control node 500 fails, the operation of the control node 500 may be switched over to a substitute node (i.e., failover occurs), or the control node 500 may be restarted. In such cases, the control node 500 or the substitute node collects the metadata from each of the disk nodes 100, 200, and 300, and reconstructs the virtual-disk metadata table 511. In the case where the storage device 110 is restored during the operation for the failover or the restart, metadata on three slices are collected as metadata on slices allocated to the segment for which the slice reallocation is performed, i.e., inconsistency occurs. In order to prevent such inconsistency, when the control node 500 reconstructs the virtual-disk metadata table 511, the control node 500 determines a slice the status of which is to be changed to the free state, by reference to the timestamp values contained in the collected metadata.

FIG. 14 is a sequence diagram indicating a sequence of processing for dissolving inconsistency by use of the time stamping. The processing of FIG. 14, which is executed when the control node 500 is restarted or when failover from the control node 500 occurs, is explained below step by step.

<Step S51> The slice-allocation management unit 550 in the control node 500 transmits a request for metadata to each of the disk nodes 100, 200, and 300.

<Step S52> When the disk node 100 receives the request for metadata, the slice management unit 160 in the disk node 100 acquires metadata from the metadata storage 150 or the storage device 110, and transmits the acquired metadata to the control node 500. Similarly, the disk nodes 200 and 300 also transmit metadata to the control node 500.

When the control node 500 collects the metadata from each of the disk nodes 100, 200, and 300, the slice-allocation management unit 550 reconstructs the virtual-disk metadata table 511 on the basis of the collected metadata. Then, the slice-allocation management unit 550 examines the metadata for consistency. In the consistency examination, it is determined whether or not three or more slices are allocated to a segment. When three or more slices are allocated to a segment, metadata on the three or more slices are compared, and one or more slices other than the slice having the timestamp value corresponding to the latest time are determined, for each of the primary slice and the secondary slice, to be deallocated from the segment.

<Step S53> The slice-allocation management unit 550 transmits a request to change metadata by changing the status of the slice to be deallocated to the free state "F", to the disk node (the disk node 100 in the example of FIG. 14) which manages the slice to be deallocated.

<Step S54> The slice management unit 160 in the disk node 100 updates the metadata stored in both of the metadata storage 150 and the storage device 110, according to the request to change metadata. Then, the slice management unit 160 returns to the control node 500 a response indicating completion of the change of the metadata.

FIG. 15 indicates examples of the contents of the virtual-disk metadata table 511 after the reconstruction. In the processing of FIG. 15, it is assumed that the control node 500 is restarted before the T1/restoration detection unit 130 transmits to the control node 500 the notice of the restoration of the storage device 110 in step S43 after the virtual-disk metadata table 511 is updated in steps S38 and S39.

In the example of FIG. 15, the slice identified by the disk-node ID "SN-A," the disk ID "1," and the slice ID "1" and the slice identified by the disk-node ID "SN-C," the disk ID "1," and the slice ID "1" are allocated for the primary slice (as indicated by the status "P" in FIG. 15) in the segment identified by the segment ID "1." Therefore, the timestamp values in the metadata for the two slices (which are doubly allocated for the primary slice) are compared by the slice-allocation management unit 550. In this example, the timestamp value of the slice corresponding to the disk-node ID "SN-A" is "t1,"

and the timestamp value of the slice corresponding to the disk-node ID "SN-C" is "t(n+1)." Since the timestamp value "t(n+1)" indicates a time after the time indicated by the timestamp value "t1," the slice corresponding to the disk-node ID "SN-C" is determined to be the valid slice. Thus, the slice-allocation management unit 550 transmits to the disk node 100 corresponding to the disk-node ID "SN-A" a request to change metadata by changing the status of the slice identified by the slice ID "1" in the storage device 110 (identified by the disk ID "1") to the free state "F."

As explained above, even when the control node 500 is restarted or failover from the control node 500 occurs before the notice of the restoration from the disk node 100 after the reallocation in metadata caused by the notice of an elapse of the irregularity-detection reference time T1 transmitted from the disk node 100, it is possible to maintain the consistency in the metadata by use of the timestamp values. That is, the updating of the metadata, which cannot be performed during the operation for the failover or the restart, can be performed after the failover or the restart.

2.8 Advantages

Since the irregularity-detection reference time T1 is detected separately from the failure-detection reference time T2, the multinode storage system according to the first embodiment has the following advantages (1) and (2).

(1) The time in which access is suspended is small even when the failure-detection reference time T2 is a great value. That is, in some disk storage devices, internal switching occurs, so that no response is returned for a duration on the order of minutes although the storage devices do not fail. Even in the case where such storage devices are used, access becomes possible when the irregularity-detection reference time T1 (e.g., one second) elapses.

(2) The failure-detection reference time T2 is not required to be adjusted for each disk storage device.

In the conventional disk storage devices, the failure-detection reference time T2 is required to be adjusted for each disk storage device for preventing erroneous detection of failure and enabling access at the earliest possible time. On the other hand, according to the first embodiment, the failure-detection reference time T2 may be set to a time in which most of the storage devices can return a response (e.g., one minute), and the irregularity-detection reference time T1 may be set to, for example, one second. Since the failure-detection reference time T2 is set to a long time, whichever type of storage devices may be used, it is possible to prevent erroneous detection of failure.

As explained above, in the multinode storage system according to the first embodiment, the access environment can recover from an irregularity in a short time, and failure can be detected with high reliability.

3. Second Embodiment

Next, a multinode storage system according to the second embodiment is explained below. The following explanations on the second embodiment are focused on the differences from the first embodiment, and the same explanations as the first embodiment are not repeated unless necessary.

The second embodiment is different from the first embodiment in that the recovery processing is started in response to an instruction from the management node 30 to isolate a disk node, without use of the failure-detection reference time T2. In the first embodiment, when the storage device 110 returns no response even after the failure-detection reference time T2 elapses since the issue of the inspection command, the disk node 100 outputs a notice of an elapse of the failure-detection reference time T2. However, in some cases, it is difficult to determine an appropriate value of the failure-detection reference time T2. For example, in the case where the manufacturers and the performance specifications of the storage devices 110, 210, and 310 are different, the values of the failure-detection reference time T2 appropriate for the storage devices 110, 210, and 310 are also different.

As explained before, in the first embodiment, when no response is returned from a storage device until the irregularity-detection reference time T1 elapses since the issue of the inspection command, the slice reallocation is performed. Therefore, data access is enabled before the restoration of the storage device. Thus, even when an elapse of the failure-detection reference time T2 is not detected, the nondetection of an elapse of the failure-detection reference time T2 does not affect the data access by the access node. However, when the storage device fails, it is necessary to recover the data stored in the storage device. Therefore, the multinode storage system according to the second embodiment is configured to instruct through the management node 30 to isolate the storage device when an administrator confirms failure of the storage device.

FIG. 16 is a sequence diagram indicating a sequence of processing for instructing isolation of a disk node from the management node in the second embodiment. The operations in steps S61 to S72 and S74 indicated in FIG. 16 are respectively identical to the operations in steps S11 to S22 and S24 indicated in FIG. 10. Therefore, only the operation in step S73, which is different from the operation in step S23 in FIG. 10, is explained below.

<Step S73> The management node 30 can acquire various information indicating the operational status from the disk nodes 100, 200, and 300 and the control node 500. The acquired information is displayed on a monitor of the management node 30. Therefore, information indicating that the storage device 110 returns no response to the inspection command can also be displayed on the monitor's screen.

The administrator of the multinode storage system recognizes that the storage device 110 is possibly faulty, at the sight of the monitor's screen in the management node 30. Then, the administrator performs an operation such as issuing of a control command (e.g., a command to restart the storage device 110) to the storage device 110. When the administrator confirms that the storage device 110 fails, the administrator inputs an instruction for making the management node 30 request isolation of the disk node 100. On receipt of the administrator's input, the management node 30 transmits to the control node 500 a request to isolate the disk node 100. In response to the request to isolate the disk node 100, the recovery processing is performed in step S74 under the control of the control node 500, so that the disk node 100 is isolated from the multinode storage system.

As explained above, according to the second embodiment, the recovery processing for the entire storage device can be started after receipt of an instruction from the administrator.

The second embodiment also has the advantage that the time in which access is suspended is small.

4. Third Embodiment

Next, a multinode storage system according to the third embodiment is explained below. The following explanations on the third embodiment are focused on the differences from the first embodiment, and the same explanations as the first embodiment are not repeated unless necessary.

4.1 Features of Third Embodiment

The third embodiment is different from the first embodiment in that a slice-abnormality notice designating a slice currently allocated to the segment is transmitted from a disk node to the control node, and a slice is reallocated to the segment on the basis of the slice-abnormality notice.

In the first and second embodiments, when an access node transmits to the control node an inquiry for metadata on a segment, the control node reallocates a slice to the segment. In this case, the processing for changing the metadata on a disk node is executed as an extension of the processing in response to the inquiry for metadata. When the disk node the metadata on which is changed by the slice reallocation normally operates, the time since the transmission of the inquiry for metadata from the access node (in step S15) until the transmission of the metadata to the access node (in step S20) can be short.

However, in some cases where the disk node the metadata on which is changed by the slice reallocation is overloaded, the response indicating the completion of the change is not returned from the disk node to the control node. In such cases, the transmission of the metadata from the control node to the access node is delayed.

In addition, in some cases, the control node performs, in a single process, the operations for searching for metadata in response to the inquiry for metadata. This is because, in some cases, from the viewpoint of system design, the total processing efficiency is higher when a short operation is repeatedly executed in a single process than when short operations are executed in multiple processes in parallel. For example, if the operations for searching for metadata in response to the inquiry for metadata are executed in multiple processes, an additional operation (such as an operation for distributing the operations for searching for metadata into the multiple processes) is necessary, so that the processing efficiency is lowered in some cases. Further, in the case where a great number of processes are initiated, a lot of resources such as memory areas are consumed, so that the processing efficiency in the entire control node can be lowered.

In the case where a great number of operations for searching for metadata in response to the inquiry for metadata are executed in a single process, when one of the operations takes a long time, execution of the following operations is delayed, so that it takes a long time until the access node acquires a response to the inquiry for the metadata. Thus, the service efficiency of the multinode storage system is lowered.

Therefore, according to the third embodiment, each disk node is configured so that when the disk node receives a request to access a slice in a storage device for which an elapse of the irregularity-detection reference time T1 is detected, the disk node sends to the control node a slice-abnormality notice. According to the third embodiment, the control node performs slice reallocation in response to the slice-abnormality notice received from a disk node, instead of performing slice reallocation as an extension of processing in response to an inquiry for metadata. Thus, slice reallocation for a segment to which the slice to be accessed is allocated can be performed without delaying a response to the inquiry for metadata.

Although the system configuration of the multinode storage system according to the third embodiment is similar to the first embodiment, the third embodiment is different from the first embodiment in the functions of the disk node and the control node as explained below.

4.2 Functions

FIG. 17 is a block diagram illustrating the functions of the respective devices constituting the multinode storage system according to the third embodiment. When each of the disk nodes 100, 200, and 300 indicated in FIG. 2 has the functions indicated in the block 400 in FIG. 17, and the control node 500 indicated in FIG. 2 has the functions indicated in the block 800 in FIG. 17, the multinode storage system according to the third embodiment is realized.

The disk node 400 comprises a slice-access processing unit 420, a T1/restoration detection unit 430, a T2 detection unit 440, a metadata storage 450, a slice management unit 460, and an objective-slice detection unit 470.

The slice-access processing unit 420 has the same function as the slice-access processing unit 120 (indicated in FIG. 5). In addition, the slice-access processing unit 420 has the function of sending to the objective-slice detection unit 470 information on a slice in a storage device the access to which becomes an error when the disk node 400 returns a message indicating the error in response to an access request from the access node 600.

The T1/restoration detection unit 430 has the same function as the T1/restoration detection unit 130 (indicated in FIG. 5). In addition, the T1/restoration detection unit 430 has the function of informing the objective-slice detection unit 470 of detection of an elapse of the irregularity-detection reference time T1 when the elapse of the irregularity-detection reference time T1 is detected. Further, the T1/restoration detection unit 430 has the function of informing the objective-slice detection unit 470 of restoration of a storage device 410 after the detection of the elapse of the irregularity-detection reference time T1 when the storage device 410 is restored after the detection of the elapse of the irregularity-detection reference time T1.

The T2 detection unit 440 has the same function as the T2 detection unit 140 (indicated in FIG. 5). In addition, the T2 detection unit 440 has the function of informing the objective-slice detection unit 470 of detection of an elapse of the failure-detection reference time T2 when the elapse of the failure-detection reference time T2 is detected.

The metadata storage 450 stores information similar to the metadata storage 150 (indicated in FIG. 5). In addition, the metadata storage 450 also stores information on the redundancy status of each slice. The redundancy status is the normal state or the copying state. In the normal state, the redundancy between the paired slices is maintained. (That is, the identity of the data stored in the paired slices is maintained.) In the copying state, data is being copied so as to establish the redundancy between the paired slices.

The slice management unit 460 has the same function as the slice management unit 160 (indicated in FIG. 5). In addition, the slice management unit 460 has the function of managing the redundancy status of the slices and setting in the metadata storage 450 the current redundancy status of each slice.

The objective-slice detection unit 470 transmits to the control node 800 a slice-abnormality notice for a slice to which the access from the access node 600 becomes an error. Specifically, notices from the T1/restoration detection unit 430 make the objective-slice detection unit 470 recognize detection of an elapse of the irregularity-detection reference time T1 for the storage device 410 or restoration of the storage device 410. In addition, a notice from the T2 detection unit 440 makes the objective-slice detection unit 470 recognize detection of an elapse of the failure-detection reference time T2 for the storage device 410. Further, a notice from the slice-access processing unit 420 makes the objective-slice detection unit 470 recognize that access to a slice in the storage device 410 becomes an error.

When access to a slice in the storage device 410 becomes an error, the objective-slice detection unit 470 checks the status of the storage device 410. Specifically, the objective-slice detection unit 470 determines whether or not the following condition is satisfied. The condition is that no response to an inspection command is returned from the storage device 410, an elapse of the irregularity-detection reference time T1 is detected, and an elapse of the failure-detection reference time T2 is not detected. When the above condition is satisfied, the objective-slice detection unit 470 transmits to the control node 800 a slice-abnormality notice in which a slice to which an attempt to access is made is designated.

The control node 800 comprises a virtual-disk metadata storage 810, a metadata search unit 820, an allocability storage 830, a storage-status management unit 840, and a slice-allocation management unit 850.

The virtual-disk metadata storage 810 has the same function as the virtual-disk metadata storage 810 (indicated in FIG. 5). The metadata search unit 820 has the same function as the metadata search unit 820 (indicated in FIG. 5) except that the function of requesting the slice-allocation management unit 850 to reallocate a slice is unnecessary in the virtual-disk metadata storage 810.

The allocability storage 830 is a function of storing allocability information for each storage device. The allocability information indicates whether or not a slice in the storage device can be allocated to a segment. For example, part of the storage area of a RAM in the control node 800 can be used as the allocability storage 830.

The storage-status management unit 840 changes the status of the storage device 410 indicated in the allocability storage 830, according to a notice from the disk node 400. Specifically, when the control node 800 receives from the disk node 400 a notice of an elapse of the irregularity-detection reference time T1, the storage-status management unit 840 changes the status of the storage device 410 indicated in the allocability storage 830, to the unallocable state. When the control node 800 receives from the disk node 400 a notice of restoration of the storage device 410, the storage-status management unit 840 changes the status of the storage device 410 indicated in the allocability storage 830, to the allocable state.

The slice-allocation management unit 850 manages allocation of slices to the segments in the virtual disk 60. For example, when the control node 800 receives a slice-abnormality notice from the disk node 400, the slice-allocation management unit 850 newly allocates another slice to the segment to which the slice indicated in the slice-abnormality notice is allocated until then.

In addition, when the control node 800 receives from the disk node 400 a notice of an elapse of the failure-detection reference time T2, the slice-allocation management unit 850 starts recovery processing for one or more segments to which one or more slices in the storage device 410 are allocated until then. In the recovery processing, the slice-allocation management unit 850 reallocates all of the one or more slices in the storage devices other than the storage device 410 (i.e., the normally operating storage devices) which are allocated until then to the one or more segments to be recovered, so that all of the one or more slices are allocated for the one or more primary slices in the one or more segments to be recovered. Then, the slice-allocation management unit 850 allocates one or more other slices in the storage devices 210 and 310 for the one or more secondary slices in the one or more segments to be recovered. Thereafter, the slice-allocation management unit 850 transmits to the disk nodes managing the normally operating storage devices a request to update the metadata according to the above reallocations. When the disk nodes which receive the above request complete the updating of the metadata, the slice-allocation management unit 850 updates the metadata stored in the virtual-disk metadata storage 810.

4.3 Metadata

FIG. 18 illustrates an example of a data structure in the metadata storage 450 in the disk node 400 in the third embodiment. The metadata storage 450 stores a metadata table 451. The metadata table 451 has the columns of "Disk-node ID," "Disk ID," "Slice ID," "Status," "Virtual-disk ID," "Segment ID," "Virtual-disk Address," "Pairing Disk-node ID," "Pairing Disk ID," "Pairing Slice ID," "Time Stamp," and "Redundancy Status." The information items tabulated in each row of the metadata table 451 are associated with each other, and constitute a record of metadata. The information items set in the above columns in the metadata table 451 are respectively similar to the identically denoted information items in the metadata table 151 (indicated in FIG. 7). The redundancy status of the slice corresponding to each record of metadata is set in the column "Redundancy Status." When the redundancy between the paired slices is maintained, a value indicating "Normal" is set in the column "Redundancy Status." When data is being copied so as to establish the redundancy between the paired slices, a value indicating "Copying" is set in the column "Redundancy Status."

FIG. 19 illustrates an example of a data structure in the virtual-disk metadata storage 810. The virtual-disk metadata storage 810 stores a virtual-disk metadata table 811. The virtual-disk metadata table 811 also has the columns of "Disk-node ID," "Disk ID," "Slice ID," "Status," "Virtual-disk ID," "Segment ID," "Virtual-disk Address," "Pairing Disk-node ID," "Pairing Disk ID," "Pairing Slice ID," "Time Stamp," and "Redundancy Status." The information items tabulated in each row of the virtual-disk metadata table 811 are associated with each other, and constitute a record of metadata. The information items set in the above columns in the virtual-disk metadata table 811 are respectively similar to the identically denoted information items in the metadata table 451.

4.4 Allocability Storage

FIG. 20 illustrates an example of a data structure in the allocability storage 830 in the third embodiment. The allocability storage 830 stores a allocability management table 831. The allocability management table 831 has the columns of "Disk-node ID," "Disk ID," and "Allocability."

The disk-node ID is set in the column "Disk-node ID." The disk-node ID is information for identification of a disk node. The disk ID is set in the column "Disk ID." The disk ID is information for identification of a storage device connected to the disk node. The flag indicating whether or not the slices in each of the storage devices can be allocated to a segment is set in the column "Allocability." When the slices corresponding to each storage device can be allocated to a segment, a value indicating "Allocable" is set in the column "Allocability." When the slices corresponding to each storage device cannot be allocated to a segment, a value indicating "Unallocable" is set in the column "Allocability."

4.5 Processing

In the multinode storage system according to the third embodiment as described above, when a storage device does not return a response to an inspection command until an elapse of the irregularity-detection reference time T1, the following processing for slice reallocation is performed.

FIG. 21 is a sequence diagram indicating a sequence of processing for slice reallocation which is performed when a storage device fails in the third embodiment. The processing of FIG. 21 is explained below step by step. In the example explained below, it is assumed that the multinode storage system has disk nodes 400a and 400b as well as the disk node 400, each of the disk nodes 400a and 400b has the same functions as the disk node 400, and the disk-node IDs of the disk nodes 400, 400a, and 400b are respectively "SN-A," "SN-B," and "SN-C." The operations in steps S88 to S95 indicated in FIG. 21 are respectively identical to the operations in steps S16 to S19 and steps S21 to S24 indicated in FIG. 10. Therefore, only the operations which are different from the operations in FIG. 10 are explained below.

<Step S81> The T1/restoration detection unit 430 in the disk node 400 periodically performs operational checking of the storage device 410 in a similar manner to step S11. Specifically, when the T1/restoration detection unit 430 detects an elapse of the irregularity-detection reference time T1 by the operational checking of the storage device 410, the T1/restoration detection unit 430 transmits to the control node 800 a notice of the elapse of the irregularity-detection reference time T1, which contains the disk-node ID of the disk node 400 and the disk ID of the storage device 410. Thereafter, the T1/restoration detection unit 430 waits for a response from the storage device 410.

When the control node 800 receives the notice of the elapse of the irregularity-detection reference time T1, the storage-status management unit 840 changes the status of the storage device 410. Specifically, the storage-status management unit 840 searches the allocability storage 830 for information corresponding to the combination of the disk-node ID and the disk ID contained in the notice of the elapse of the irregularity-detection reference time T1. Then, the storage-status management unit 840 changes the flag indicating the allocability to "Unallocable." FIG. 22 indicates examples of the contents of the allocability storage 830 after the change of the allocability. As indicated in FIG. 22, the allocability status corresponding to the combination of the disk-node ID "SN-A" and the disk ID "1" is changed to "Unallocable." Therefore, the control node 800 can recognize that the slices in the storage device 410 connected to the disk node 400 cannot be allocated to a segment.

<Step S82> When the change of the allocability status is completed, the storage-status management unit 840 transmits to the disk node 400 a response indicating the completion of the change.

<Step S83> When a request for access to data in the virtual disk 60 occurs in response to a user's manual input into one of the terminals 21, 22, and 23, the slice-access request unit 630 in the access node 600 refers to the metadata-for-access storage 620, and determines the disk node managing the data to be accessed. (In the example of FIG. 21, it is assumed that read access to a slice managed by the disk node 400 occurs.) Then, the slice-access request unit 630 transmits to the disk node 400 a (data read) request to read the data to be accessed. The slice-access processing unit 420 in the disk node 400 refers to the metadata storage 450, confirms that the slice to be accessed is a slice in the storage device 410 managed by the disk node 400, and performs read access designating the data in the slice in the storage device 410.

In the example of FIG. 21, a data read request is outputted from the access node 600 after the T1/restoration detection unit 430 detects an elapse of the irregularity-detection reference time T1. In this case, it is possible to recognize that the storage device 410 fails, or is in such an overloaded situation that the storage device 410 cannot return a response to the inspection command in the irregularity-detection reference time T1. When the storage device 410 fails, access to the storage device 410 becomes an error. When the storage device 410 is in an overloaded situation, access to data also becomes an error with high frequency. In the example of FIG. 21, it is assumed that the storage device 410 (corresponding to the disk-node ID "SN-A") fails. Therefore, the read request to read data from the leading slice (having the slice ID "1") in the storage device 410 (having the disk ID "1") becomes an error.

<Step S84> The slice-access processing unit 420 in the disk node 400 returns a response, indicating the error, to the read request from the access node 600. Then, the slice-access request unit 630 in the access node 600 informs the metadata inquiry unit 610 of the occurrence of the error. At this time, the slice-access request unit 630 informs the metadata inquiry unit 610 of the virtual-disk ID and the segment ID of the segment the access to which becomes an error.

<Step S85> In addition, when the slice-access processing unit 420 in the disk node 400 fails in reading data from the storage device 410 according to the read request, the slice-access processing unit 420 informs the objective-slice detection unit 470 of the occurrence of the error. At this time, the slice-access processing unit 420 passes to the objective-slice detection unit 470 the combination of the disk ID and the slice ID identifying the slice in the storage device as the objective in the access. Then, the objective-slice detection unit 470 determines the status of the storage device in which the error occurs. That is, the objective-slice detection unit 470 determines whether or not both of the following first and second conditions are satisfied. The first condition is that the objective-slice detection unit 470 is informed by the T1/restoration detection unit 430 of an elapse of the irregularity-detection reference time T1 and is not informed of restoration of the storage device 410, and the second condition is that the objective-slice detection unit 470 is not informed by the T2 detection unit 440 of an elapse of the failure-detection reference time T2. When the objective-slice detection unit 470 determines that both of first and second conditions are satisfied, the objective-slice detection unit 470 recognizes that failure of the storage device 410 is not yet determined (and recovery processing for the entire storage device 410 is not started) although a possibility of failure of the storage device 410 exists. Therefore, in this case, the objective-slice detection unit 470 informs the slice management unit 460 that the status of the slice as the objective of the access is to be changed to the abnormal ("B" for "bad") state. Then, the slice management unit 460 searches the metadata storage 450 for the metadata on the slice as the objective of the access, and changes the status of the slice as the objective of the access to the abnormal ("B") state. Thereafter, when the storage device 410 is restored, the slice management unit 460 changes the status of the slice as the objective of the access in the metadata held in the storage device 410 to the "B" state.

Further, when both of first and second conditions are satisfied, the objective-slice detection unit 470 transmits to the control node 800 a slice-abnormality notice, which contains the disk ID and the slice ID of the slice in the storage device 410 as the objective of the access. When the control node 800 receives slice-abnormality notice, the slice-allocation management unit 850 performs processing for slice reallocation for the segment to which the slice as the objective of the access is allocated (i.e., the segment to be recovered). Specifically, the slice-allocation management unit 850 refers to the virtual-disk metadata storage 810, and determines whether the abnormal slice indicated in the slice-abnormality notice is the primary slice or the secondary slice in the segment to be recovered.

When the abnormal slice is the primary slice, the slice-allocation management unit 850 changes the status of the slice which is allocated until then for the primary slice in the segment to be recovered, to the free state "F," and changes the secondary slice in the segment to the primary slice. Thereafter, the slice-allocation management unit 850 allocates a free slice managed by a disk node different from the disk node managing the above primary slice reallocated from the secondary slice, for the secondary slice in the segment to be recovered.

When the abnormal slice is the secondary slice, the slice-allocation management unit 850 changes the status of the slice which is allocated until then for the secondary slice in the segment to be recovered, to the free state "F". Thereafter, the slice-allocation management unit 850 allocates a free slice managed by a disk node different from the disk node managing the current primary slice, for the secondary slice in the segment to be recovered.

Incidentally, in the example of FIG. 21, the slice-abnormality notice is outputted in response to the read request from the access node 600. Since only the primary slice is accessed in response to the read request, the abnormal slice indicated in the slice-abnormality notice is the primary slice. Therefore, the secondary slice can be detected as an abnormal slice only when a write request is issued. For example, in the case where a write request to write data in a slice managed by the disk node 400 is issued while the storage device 410 managed by the disk node 400 normally operates (i.e., while the storage device 410 is in such a situation that the storage device 410 can return a response to an inspection command in the irregularity-detection reference time T1), the data is written in the slice in the storage device 410. At this time, in order to maintain the redundancy, the slice management unit 460 also writes the same data in the secondary slice paired with the accessed slice. When the writing in the secondary slice becomes an error, the disk node managing the secondary slice transmits a slice-abnormality notice to the control node 800. Then, the slice-allocation management unit 850 recognizes that the abnormal slice is the secondary slice, and performs reallocation of a slice for the secondary slice in the segment to be recovered. When details of the reallocation of the slice for the secondary slice are fixed, the slice-allocation management unit 850 updates the corresponding metadata in the virtual-disk metadata storage 810.

FIG. 23 indicates examples of the contents of the virtual-disk metadata table 811 in the virtual-disk metadata storage 810 after the updating. As indicated in FIG. 23, the status is changed to "B" in the record of metadata on the slice identified by the disk-node ID "SN-A," the disk ID "1," and the slice ID "1." As mentioned before, the status "B" indicates that the slice corresponding to the record of metadata is in an abnormal (bad) state. Thus, the above slice in the storage device 410 is deallocated from the segment (having the segment ID "1") on which the metadata is inquired for. In addition, the status is changed to "P" in the record of metadata on the slice identified by the disk-node ID "SN-C," the disk ID "1," and the slice ID "1." That is, the slice which is allocated until then for the secondary slice in the segment to be recovered is reallocated for the primary slice. Further, in the record of metadata on the slice identified by the disk-node ID "SN-B," the disk ID "1," and the slice ID "2," the status is changed to "S," the virtual-disk ID is set to "LVOL-X," and the segment ID is set to "1." Thus, this slice is newly allocated for the secondary slice in the segment to be recovered. Moreover, the timestamp value (indicating the update time) in each record of metadata in which information such as the status is changed is updated to "t(n+1)."

After the above updating of the metadata is completed, when the control node 800 receives an inquiry for metadata on the segment recovered as above, the metadata search unit 820 can provide to the access node 600 the metadata indicating the status after the recovery of the segment.

The explanation goes on with reference to FIG. 21.

<Step S86> The metadata inquiry unit 610 transmits to the control node 800 an inquiry for metadata designating a segment. The designated segment (i.e., the segment about which the inquiry is made) is the segment the access to which becomes an error.

<Step S87> The metadata search unit 820 in the control node 800 refers to (searches) the virtual-disk metadata storage 810 for the metadata on the primary slice in the segment about which the inquiry is made, and transmits to the access node 600 the metadata searched for. During the above operation of searching for the metadata in response to the inquiry, the slice-allocation management unit 850 in the control node 800 is executing the recovery processing for the segment to be recovered in a process different from the process in which the operation of searching for the metadata is executed. Specifically, the operations in steps S88 to S91 are performed in succession to the slice allocation. Thereafter, in step S92, the access node 600 performs a read-retry operation on the disk node 400b. Then, in step S93, the requested data is transmitted to the access node 600. Further, when the access node 600 is informed of an elapse of the failure-detection reference time T2 in step S94, processing for recovering the storage device is performed in step S95.

As explained above, it is possible to perform processing for recovering only the segment to which the slice to be accessed is allocated, before the elapse of the failure-detection reference time T2 is detected. In addition, the processing for recovering the segment is performed in response to the slice-abnormality notice transmitted from the disk node 400. Therefore, it is possible to prevent impediment to the operation of searching for metadata in response to the inquiry for the metadata, and lowering of the processing efficiency in the entire system.

Next, processing for slice reallocation which is performed in the case where a response to an inspection command is delayed because of transient overload during normal operation of the storage device 410 is explained below.

FIG. 24 is a sequence diagram indicating a sequence of processing for slice reallocation which is performed when the load imposed on the storage device 410 is transiently excessive in the third embodiment. In the example of FIG. 24, it is assumed that the load imposed on the storage device 410 (connected to the disk node 400) is transiently excessive. The operations in steps S101 to S113 in FIG. 24 are similar to the operations in steps S81 to S93 in FIG. 21. Therefore, only the operations performed in step S114 and the following steps are explained below step by step.

<Step S114> The T1/restoration detection unit 430 receives from the storage device 410 a response to an inspection command, so that the T1/restoration detection unit 430 detects restoration of the storage device 410 to a state in which the storage device 410 can be accessed. Then, the T1/restoration detection unit 430 transmits to the control node 800 a notice of the restoration of the storage device 410. On receipt of the notice of the recovery, the storage-status management unit 840 in the control node 800 changes the allocability information for the restored storage device stored in the allocability storage 830, to "Allocable."

<Step S115> After the allocability information in the allocability storage 830 is changed, the storage-status management unit 840 transmits an acknowledge response to the disk node 400.

Although, according to the first embodiment, when a storage device is restored after detection of an elapse of the irregularity-detection reference time T1, the status of a slice in the restored storage device which has been allocated (before the slice reallocation) to the recovered segment (the aforementioned segment about which the inquiry is made) is changed to the free state "F." On the other hand, according to the third embodiment, the status of a slice which is accessed after detection of an elapse of the irregularity-detection reference time T1 is changed to the abnormal (bad) state "B" at the time of the access. Therefore, according to the third embodiment, it is unnecessary to change the corresponding metadata even when the storage device containing the slice is restored.

Incidentally, the diagnosis for failure in response to an inspection command is performed in all the disk nodes 400, 400a, and 400b. In the example of FIG. 21, it is assumed that an elapse of the irregularity-detection reference time T1 is detected in only one storage device. However, generally, an elapse of the irregularity-detection reference time T1 can be concurrently detected in each of more than one storage device. In the case where the slice pair constituting one of the segments in the virtual disk is realized by two slices respectively contained in the two storage devices, if the status of each of the two slices is changed to "the abnormal state "B," the data in the segment is lost. Therefore, according to the third embodiment, the disk node for which the elapse of the irregularity-detection reference time T1 is detected later does not transmit the slice-abnormality notice.

FIG. 25 is a sequence diagram indicating a sequence of processing for slice allocation which is performed when an elapse of the time T1 is detected in more than one disk in the third embodiment. In the example of FIG. 25, it is assumed that the storage device 410 connected to the disk node 400 fails and the load imposed on the storage device connected to the disk node 400b is transiently excessive. The operations in steps S121 to S131 in FIG. 25 are similar to the operations in steps S81 to S91 in FIG. 21. Therefore, only the operations performed in step S132 and the following steps are explained below step by step.

<Step S132> The disk node 400b periodically performs disk diagnosis of the storage device connected to the disk node 400b. When the storage device connected to the storage device managed by the disk node 400b normally operates, the storage device managed by the disk node 400b can return a response to the inspection command in the irregularity-detection reference time T1. In the example of FIG. 25, it is assumed that the storage device managed by the disk node 400b normally operates before step S131, and thereafter the storage device managed by the disk node 400b comes into an overloaded state before the copying operation corresponding to the change in metadata is completed. Because of the overloaded state of the storage device managed by the disk node 400b, a normal response is not returned to the disk node 400b even when the irregularity-detection reference time T1 elapses since the issue of the inspection command. Therefore, the disk node 400b detects the elapse of the irregularity-detection reference time T1, and transmits to the control node 800 a notice of the elapse of the irregularity-detection reference time T1. When the control node 800 receives the notice of the elapse of the irregularity-detection reference time T1, the storage-status management unit 840 in the control node 800 changes the status of (allocability information on) the storage device managed by the disk node 400b to the state "Unallocable."

<Step S133> When the change in the allocability information is completed, the storage-status management unit 840 transmits to the storage device 400b a notice of the completion of the change in the allocability information.

<Step S134> After the metadata in the metadata-for-access storage 620 in the access node 600 is updated with the metadata received in step S127 in response to the inquiry for metadata, the slice-access request unit 630 determines a disk node managing a slice to be accessed, by reference to the metadata-for-access storage 620, and transmits to the disk node 400b a read request (for a read retry). It is assumed that neither of an elapse of the failure-detection reference time T2 and restoration of the storage device managed by the disk node 400b is detected by the disk node 400b at this time. In this case, the disk node 400b checks the status of the slice which is to be accessed and is designated in the read request, on the basis of a record of metadata identified by the disk-node ID "SN-C," the disk ID "1," and the slice ID "1" in the metadata held by the disk node 400b. Since the metadata held by the disk node 400b is updated in accordance with the request for updating the metadata received in step S129, the metadata held by the disk node 400b is identical to the metadata being stored in the virtual-disk metadata table 811 indicated in FIG. 23 and corresponding to the disk-node ID "SN-C." Therefore, the status of the slice in the record of metadata identified by the disk-node ID "SN-C," the disk ID "1," and the slice ID "1" is changed from the secondary slice to the primary slice. However, at this time, the data in the above slice in the disk node 400b is still being copied into the slice in the storage device 400a as the secondary slice paired with the slice in the disk node 400b. Since the data copying is not yet completed, the disk node 400b does not transmit a slice abnormality notice, and waits until data reading becomes possible.

<Step S135> Thereafter, the T2 detection unit 440 in the disk node 400 detects an elapse of the failure-detection reference time T2 since the issue of the inspection command. Then, the T2 detection unit 440 transmits to the control node 800 a notice of the elapse of the failure-detection reference time T2.

<Step S136> When the control node 800 receives the notice of the elapse of the failure-detection reference time T2, the slice-allocation management unit 850 in the control node 800 recognizes that the storage device 410 fails and cannot be used, and starts processing for recovering the entire storage device 410.

<Step S137> On the other hand, the disk node 400b receives from the storage device managed by the disk node 400b a response to the inspection command. Then, the storage device 400b transmits a notice of restoration to the control node 800.

<Step S138> When the control node 800 receives the notice of restoration from the disk node 400b, the storage-status management unit 840 updates the metadata in the allocability storage 830, and then transmits an acknowledge response to the storage device 400b.

As explained above, a disk node continues a data reading operation for copying data from a storage device managed by the disk node into another storage device for recovering data redundancy even when the disk node detects an elapse of the irregularity-detection reference time T1 in the storage device managed by the disk node, and receives a request to access a slice in the storage device managed by the disk node. That is, while the operation for copying data from the storage device managed by the disk node into the other storage device for recovering data redundancy continues, the disk node neither change the status of the slice requested to be accessed to the abnormal state "B," nor transmit a slice abnormality notice to the control node 800. Thus, it is possible to prevent the primary slice from being regarded as an abnormal slice before the copying for recovering the data redundancy is completed, and therefore prevent the data from being lost.

Next, disk diagnosis processing performed in a disk node are explained in detail. The disk diagnosis processing is periodically performed at predetermined intervals. Although the following operations are assumed to be performed in the disk node 400, similar disk diagnosis processing is periodically performed in either of the disk nodes 400a and 400b.

FIG. 26 is a flow diagram indicating a sequence of the disk diagnosis processing in the third embodiment. The processing of FIG. 26 is explained below step by step.

<Step S151> The T1/restoration detection unit 430 outputs an inspection command to the storage device 410. At this time, the T1/restoration detection unit 430 stores in an internal memory the time of the output of the inspection command.

<Step S152> The T1/restoration detection unit 430 determines whether or not the irregularity-detection reference time T1 elapses since the issue of the inspection command. Specifically, the T1/restoration detection unit 430 obtains the difference between the time of the issue of the inspection command and the current time. When the difference is equal to or greater than the irregularity-detection reference time T1, the T1/restoration detection unit 430 determines that the irregularity-detection reference time T1 elapses since the issue of the inspection command. When the elapse of the irregularity-detection reference time T1 is detected, the operation goes to step S155. When the irregularity-detection reference time T1 does not elapse, the operation goes to step S153.

<Step S153> The T1/restoration detection unit 430 checks for completion of the disk diagnosis. Specifically, the T1/restoration detection unit 430 determines whether or not a normal response is returned from the storage device 410.

<Step S154> When a normal response is returned from the storage device 410, the T1/restoration detection unit 430 completes the processing of FIG. 26. When no normal response is returned from the storage device 410, the operation goes to step S152.

<Step S155> When the irregularity-detection reference time T1 elapses since the issue of the inspection command, the T1/restoration detection unit 430 transmits a notice of the elapse of the irregularity-detection reference time T1 to the control node 800.

<Step S156> The T2/restoration detection processing is performed in cooperation between the plurality of functions in the disk node 400. When the T2/restoration detection processing is completed, the disk diagnosis processing is completed. The T2/restoration detection processing is explained in detail below with reference to FIG. 27.

FIG. 27 is a flow diagram indicating a sequence of the T2/restoration detection processing in the third embodiment. The processing of FIG. 27 is explained below step by step.

<Step S161> The T2 detection unit 440 determines whether or not the failure-detection reference time T2 elapses since the issue of the inspection command. Specifically, the T2 detection unit 440 acquires from the T1/restoration detection unit 430 the time of the issue of the inspection command, and then obtains the difference between the time of the issue of the inspection command and the current time. When the difference is equal to or greater than the failure-detection reference time T2, the T2 detection unit 440 determines that the failure-detection reference time T2 elapses since the issue of the inspection command. When the elapse of the failure-detection reference time T2 is detected, the operation goes to step S162. When the failure-detection reference time T2 does not elapse, the operation goes to step S163.

<Step S162> The T2 detection unit 440 transmits a notice of the elapse of the failure-detection reference time T2 to the control node 800. Thereafter, the processing of FIG. 27 is completed.

<Step S163> The slice-access processing unit 420 determines whether or not an access request to access the storage device 410 is inputted. When yes is determined, the operation goes to step S165. When no is determined, the operation goes to step S164.

<Step S164> The T1/restoration detection unit 430 determines whether or not the diagnosis is completed. Specifically, the T1/restoration detection unit 430 determines whether or not a normal response is returned from the storage device 410. When the diagnosis is completed, the operation goes to step S170.

<Step S165> The slice-access processing unit 420 determines whether or not the data in the slice to be accessed is being copied. Specifically, the slice-access processing unit 420 refers to the metadata storage 450, and checks the redundancy status of the slice to be accessed. When the redundancy status of the slice to be accessed, which is indicated in the metadata storage 450, is "Copying," the data in the slice to be accessed is being copied, so that the operation goes to step S166. When the data in the slice to be accessed is not being copied, the operation goes to step S167.

<Step S166> The slice-access processing unit 420 performs (access) processing for access to the storage device 410 according to the access request. The access processing does not succeed until the storage device 410 is restored. Therefore, the slice-access processing unit 420 waits for restoration of the storage device 410, and performs data reading or writing according to the access request when the storage device 410 is restored. Thereafter, the operation goes to step S170.

<Step S167> While the data in the slice to be accessed is not being copied, the slice-access processing unit 420 informs the objective-slice detection unit 470 that an access request to a slice in the storage device 410 occurs. Then, the objective-slice detection unit 470 confirms, on the basis of the disk diagnosis processing of the storage device 410, that the storage device 410 is in a state after the elapse of the irregularity-detection reference time T1 since the issue of the inspection command, before an elapse of the failure-detection reference time T2, and before restoration of the storage device 410. Subsequently, the objective-slice detection unit 470 transmits to the slice management unit 460 a request to change metadata. In response to the request to change metadata, the slice management unit 460 updates the metadata (stored in the metadata storage 450) on the slice to be accessed so as to change the status of the slice to be accessed to the abnormal state "B." In addition, when the storage device 410 is restored, the slice management unit 460 also updates the metadata stored in the storage device 410 as the metadata stored in the metadata storage 450.

<Step S168> The objective-slice detection unit 470 transmits a slice-abnormality notice to the control node 800.

<Step S169> The slice-access processing unit 420 transmits a notice of an access error to the access node 600. Thereafter, the operation goes to step S170.

<Step S170> When a normal response is returned, the operation of the T1/restoration detection unit 430 goes to step S171. When no normal response is returned, the operation of the T1/restoration detection unit 430 goes to step S161.

<Step S171> The T1/restoration detection unit 430 transmits a notice of restoration to the control node 800. Then, the processing of FIG. 27 is completed.

As explained above, even when an elapse of the irregularity-detection reference time T1 is detected in a storage device containing a slice allocated to a segment which is being recovered, and a request to access the slice occurs, no slice-abnormality notice is sent to the control node. Therefore, it is possible to prevent loss of data even when an elapse of the irregularity-detection reference time T1 is concurrently detected in more than one storage device.

4.6 Advantages

The multinode storage system according to the third embodiment has the following advantages.

(1) The slice reallocation is performed in response to a slice-abnormality notice transmitted from a disk node. Therefore, it is possible to prevent delay in the operation of searching for metadata in response to an inquiry for the metadata. Thus, even when the operations for the slice reallocation and metadata change associated with the slice allocation take much time, the access node can receive a response to the inquiry without delay. Further, even when an irregularity concurrently occurs in each of more than one storage device, it is possible to suppress delay in data access by the access node as much as possible.

(2) It is possible to reduce the time for which the data access from the access node is suspended, and lengthen the failure-detection reference time T2. Therefore, it is unnecessary to adjust the failure-detection reference time T2 for each storage device.

5. Variations

In the multinode storage system according to the third embodiment, it is possible to use the status storage 530 (which is used in the first embodiment) instead of the allocability storage 830. In this case, the normal state indicated as "Normal" in the status storage 530 is regarded as the state "Allocable," and the state after an elapse of T1 indicated as "T1" in the status storage 530 is regarded as the state "Unallocable."

Further, in the multinode storage system according to the first embodiment, it is also possible to determine each slice in a storage device in which an elapse of the irregularity-detection reference time T1 is detected, to be unallocable in the recovery processing in a similar manner to the third embodiment.

6. Recording Mediums Storing Programs

The processing functions of each of the systems according to the first to third embodiments which are explained above can be realized by computers. In this case, a program describing details of processing for realizing the functions which each of the control nodes and the disk nodes constituting the multinode storage systems according to the first to third embodiments should have is provided. When a computer executes the program describing details of processing for realizing the functions which each of the control nodes and the disk nodes constituting the multinode storage systems according to the first to third embodiments should have, the processing functions of the node can be realized on the computer.

The program describing the details of the processing can be stored in a computer-readable recording medium which can be read by the computer. The computer-readable recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes each program according to the present invention stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, each computer can sequentially execute processing in accordance with each portion of a program every time the portion of the program is transferred from the server computer.

7. Additional Matters

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A non-transitory computer-readable recording medium which stores a data management program for managing data redundantly stored in a plurality of storage devices having storage areas split into a plurality of slices for data management, the data management program causing a computer to perform a procedure comprising:

receiving irregularity information indicating that a possibility of failure of a first storage device exists;

storing the irregularity information of the first storage device in a memory;

determining, by reference to the irregularity information stored in the memory, whether or not a possibility of failure of the first storage device containing a slice to be accessed exists, on receipt of access information indicating occurrence of a request to access the slice to be accessed;

instructing a first slice management unit to perform processing for recovering data stored in the slice to be accessed, where the first slice management unit has a function of managing data input into and data output from a second storage device which stores redundant data identical to the data stored in the slice to be accessed, when the determining determines that the possibility of failure of the first storage device containing the slice to be accessed exists, wherein the instructing restrains against instructing for recovering data stored in a slice not to be accessed belonging to the first storage device until receipt of failure-detection information indicating that the first storage device is faulty; and deleting the irregularity information of the first storage device from the memory, when restoration information indicating that normal operation of the first storage device is confirmed is received before receipt of the failure-detection information.

2. The non-transitory computer-readable recording medium according to claim 1, wherein the irregularity information which the receiving receives is transmitted through a network to the computer from a disk node connected to the first storage device which is possibly faulty.

3. The non-transitory computer-readable recording medium according to claim 1, wherein the access information is transmitted to the computer from an access node when access to a slice in the plurality of storage devices by the access node through a network fails.

4. The non-transitory computer-readable recording medium according to claim 3, wherein when the computer receives the access information from the access node, the determining informs the access node of a location in which the redundant data is stored.

5. The non-transitory computer-readable recording medium according to claim 1, wherein the first slice management unit is a function possessed by a disk node which is connected to the computer through a network and to the second storage device.

6. The non-transitory computer-readable recording medium according to claim 1, wherein the data management program causing the computer to further function as a virtual-disk metadata storage storing metadata which indicates allocation of two slices belonging to different ones of the plurality of storage devices to each of a plurality of segments constituting a virtual disk, and the metadata is constituted by portions for the plurality of slices in the plurality of storage devices, wherein the access information is an inquiry about allocation designating one of the plurality of segments as a segment about which the inquiry is made, where a slice in a third storage device to which access by an access node through a network fails is allocated to the one of the plurality of segments, and the inquiry is transmitted from the access node when the access to the slice in the third storage device fails, and wherein the determining includes:

searching the virtual-disk metadata storage for metadata on two slices allocated to the segment about which the inquiry is made, refers to the memory, and determines, on the basis of the metadata searched for, whether or not a possibility of failure of a fourth storage device to which each of the two slices belongs exists, and deallocating, from the segment about which the inquiry is made, one of the two slices belonging to a fifth storage device, and newly allocating another of the plurality of slices to the segment about which the inquiry is made, when the searching determines that a possibility of failure of the fifth storage device exists.

7. The non-transitory computer-readable recording medium according to claim 6, wherein the deallocating updates the metadata stored in the virtual-disk metadata storage according to allocation of said another of the plurality of slices to the segment about which the inquiry is made, when the allocation of said another of the plurality of slices is completed, and when the searching determines that the possibility of failure of the fifth storage device to which the one of the two slices belongs exists, the searching waits for the allocation of said another of the plurality of slices to the segment about which the inquiry is made, acquires from the virtual-disk metadata storage metadata on two slices allocated to the segment about which the inquiry is made, after the allocation of said another of the plurality of slices to the segment about which the inquiry is made, and transmits the acquired metadata to the access node.

8. The non-transitory computer-readable recording medium according to claim 6, wherein the deallocating refers to the memory, and selects, as said another of the plurality of slices, one of the plurality of slices belonging to one of the plurality of storage devices for which existence of a possibility of failure is not indicated in the irregularity information stored in the memory.

9. The non-transitory computer-readable recording medium according to claim 1, wherein when the determining receives failure-detection information that the first storage device is faulty, the instructing instructs one or more second slice management units to perform processing for recovering all data stored in the first storage device, where the one or more second slice management units have a function of managing data input into and data output from one or more of the plurality of storage devices which store redundant data identical to the data stored in the first storage device.

10. A multinode storage system for managing data redundantly stored in a plurality of storage devices having storage areas split into a plurality of slices for data management, comprising:

a plurality of disk nodes including one or more processors configured to perform a procedure comprising:

issuing an inspection command to a first storage device and measuring a time elapsing from when the inspection command is issued until receipt of a response to the inspection command;

transmitting to a control node irregularity information indicating that a possibility of failure of the first storage device exists, when response to the inspection command is not received from the first storage device even after the time elapsing from when the inspection command is issued reaches a preset irregularity-detection reference time;

transmitting to the control node restoration information indicating restoration of the first storage device, when the response to the inspection command is received from the first storage device after transmission of the irregularity information; and transmitting to the control node failure detection information indicating failure of the first storage device, when the response to the inspection command is not received from the first storage device even after the time elapsing from when the inspection command is issued reaches a preset failure-detection reference time, which is greater than the preset irregularity-detection reference time; and the control node including one or more processors configured to perform a procedure comprising:
  receiving the irregularity information that the first storage device exists from a first node connected to the first storage device;
  storing the irregularity information of the first storage device in a memory;
  determining, by reference to the irregularity information stored in the memory, whether or not a possibility of failure of the first, storage device containing a slice to be accessed exists, on receipt of access information indicating occurrence of a request to access the slice to be accessed;
  instructing a second disk node to perform processing for recovering data stored in the slice to be accessed, where the second disk node is connected to a second storage device which stores redundant data identical to the data stored in the slice to be accessed, when the determining determines that the possibility of failure of the first storage device containing the slice to be accessed exists, wherein the instructing restrains against instructing for recovering data stored in a slice not to be accessed belonging to the first storage device until receipt of failure-detection information indicating that the first storage device is faulty; and
  deleting the irregularity information of the first storage device from the memory, when restoration information indicating that normal operation of the first storage device is confirmed is received before receipt of the failure-detection information.

* * * * *